United States Patent [19]

Krude

[11] Patent Number: 4,938,732
[45] Date of Patent: Jul. 3, 1990

[54] CONTINUOUSLY VARIABLE TRANSMISSION SYSTEM HAVING VARIABLE DIAMETER PULLEY ASSEMBLIES RESPONSIVE TO AXIALLY DIRECTED FORCES

[75] Inventor: Werner Krude, Oxford, Mich.

[73] Assignee: GKN Automotive, Inc., Auburn Hills, Mich.

[21] Appl. No.: 365,609

[22] Filed: Jun. 13, 1989

[51] Int. Cl.⁵ ............................................. F16H 11/02
[52] U.S. Cl. ......................................... 474/53; 474/56
[58] Field of Search ........................................ 474/49–56

[56] References Cited

U.S. PATENT DOCUMENTS

| | | | |
|---|---|---|---|
| 4,295,836 | 10/1981 | Kumm | 474/53 X |
| 4,714,452 | 12/1987 | Kumm et al. | 474/53 X |
| 4,768,996 | 9/1988 | Kumm | 474/53 X |
| 4,824,419 | 4/1989 | Kumm | 474/56 X |

Primary Examiner—Thuy M. Bui
Attorney, Agent, or Firm—Remy J. VanOphem

[57] ABSTRACT

A continuously variable transmission having a variable diameter pulley assembly. The variable diameter pulley assembly has an array of belt engaging elements arranged in a circular pattern having a diameter variable as a function of the relative rotational orientation of supporting inner disk members and outer disk members. A hub connected to the outer disk members has a plurality of helical slots concentric with the axis of rotation. A concentric disk drive member has a plurality of helical slots which rotate in the opposite direction of the helical slots in the hub. Each helical slot in the disk drive member crosses one of the helical slots in the hub to form a plurality of through apertures. An actuator pin disposed in each through aperture locks the disk member to the hub for rotation. An axially displaceable pin cage displaces the actuator pins along the axis of rotation. The axial displacement of the actuator pins in the crossing helical slots rotates the disk drive member and the inner disk members relative to the hub and the outer disk members radially displacing the belt engaging members. An alternate embodiment has crossing helical grooves in place of the crossing helical slots and a ball received in the intersection of the crossing helical grooves.

64 Claims, 9 Drawing Sheets

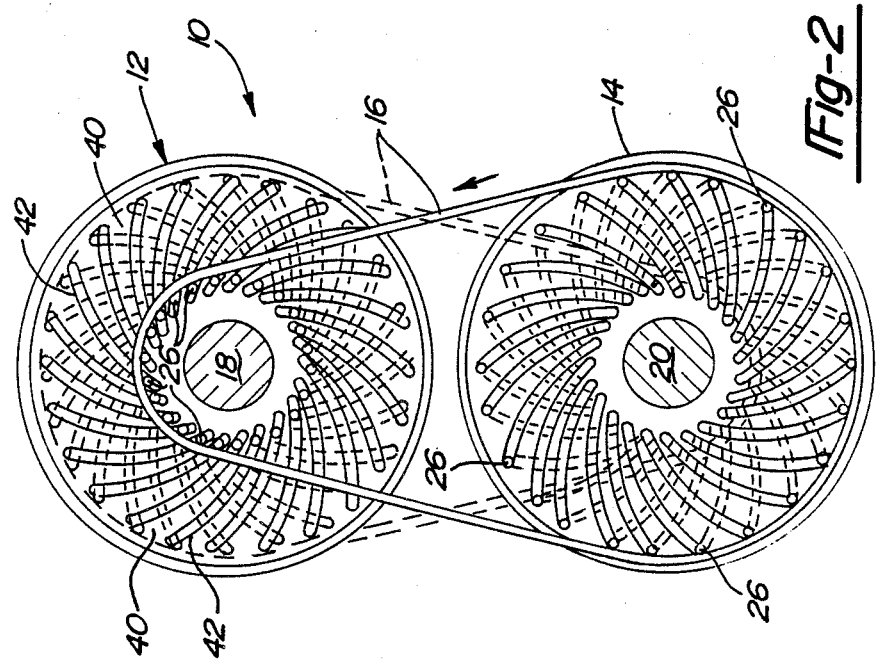
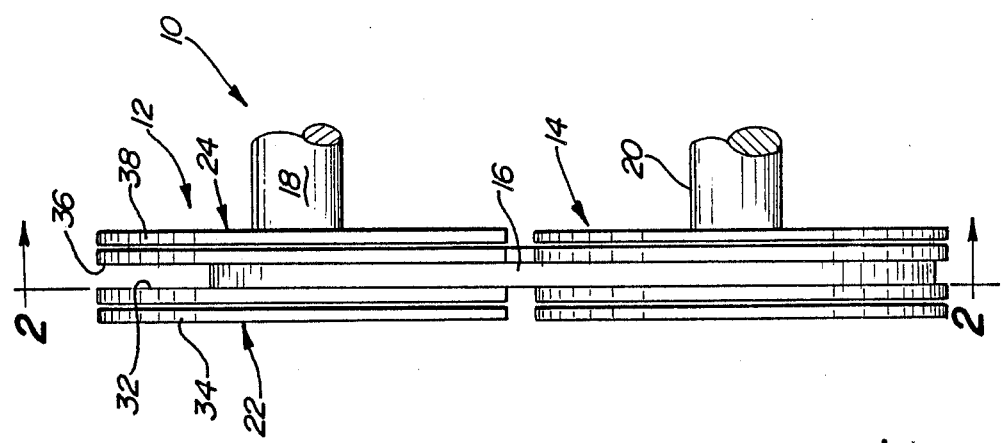

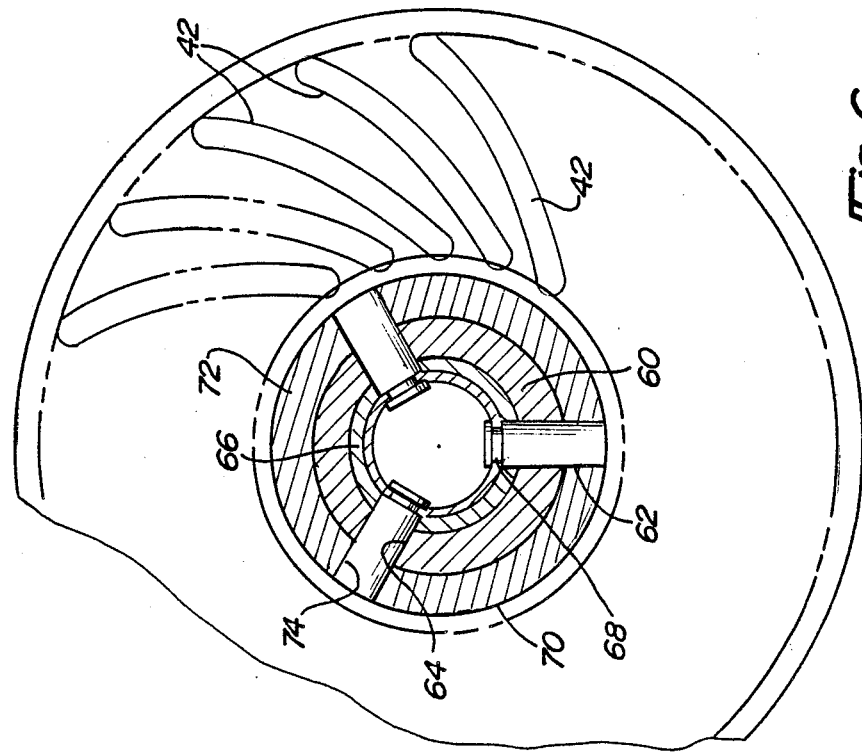
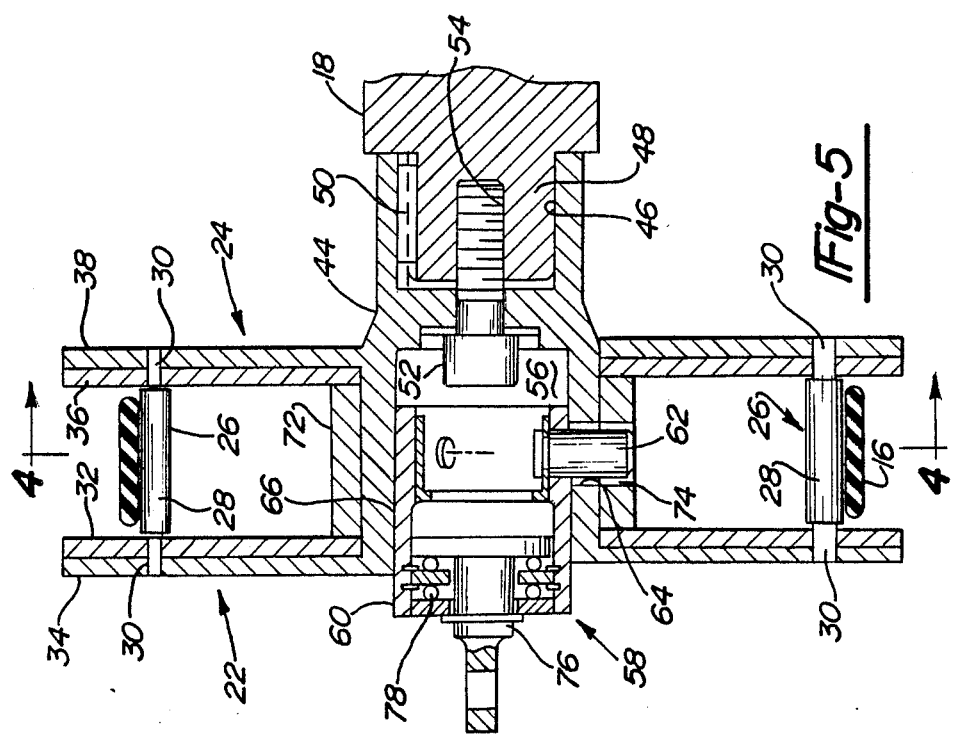

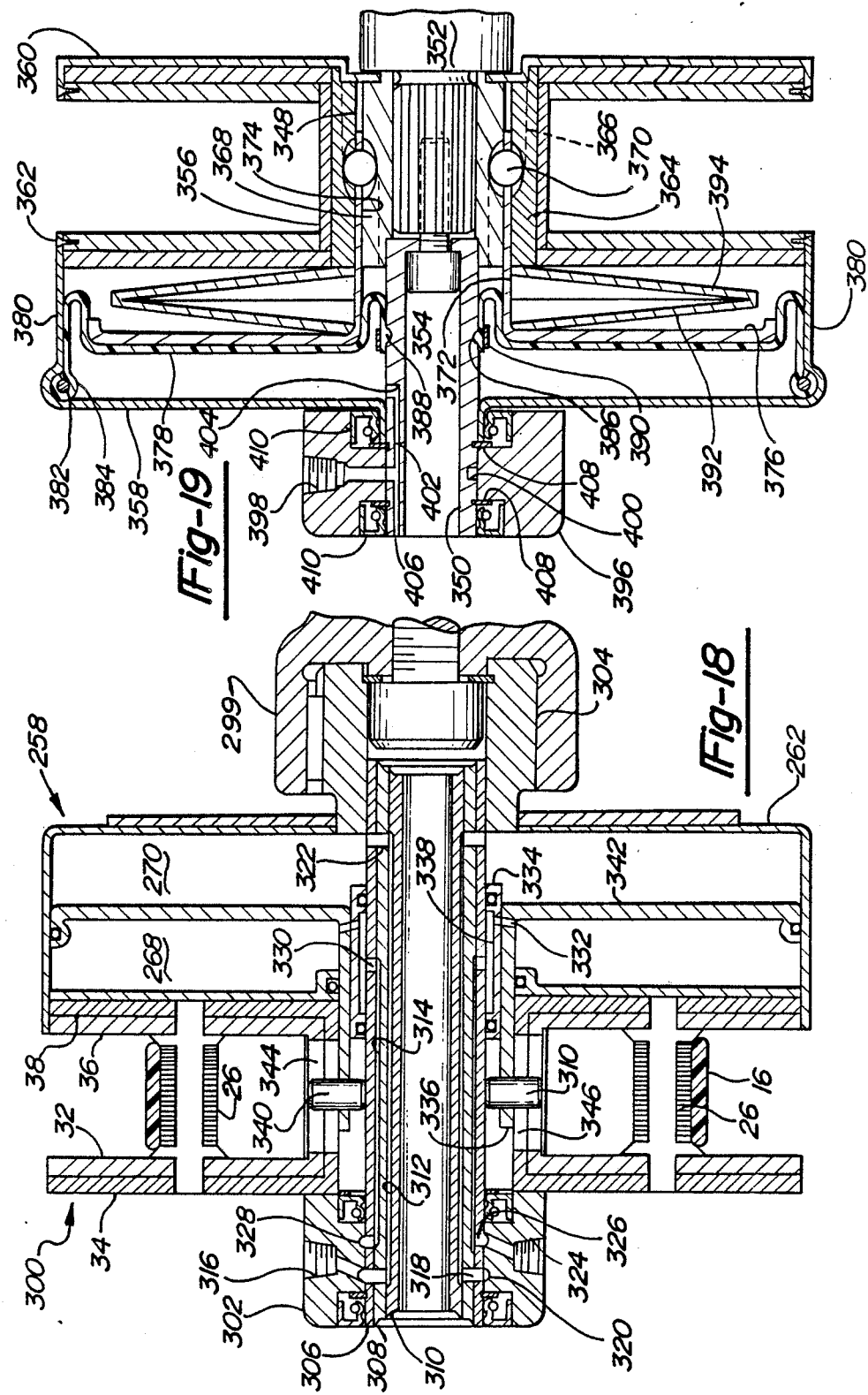

CONTINUOUSLY VARIABLE TRANSMISSION SYSTEM HAVING VARIABLE DIAMETER PULLEY ASSEMBLIES RESPONSIVE TO AXIALLY DIRECTED FORCES

BACKGROUND OF THE INVENTION

1. Field of the Invention

This invention is related to continuously variable transmission systems and more particularly to a continuously variable transmission system having a variable diameter pulley assembly responsive to axially directed forces.

2. Description of the Prior Art

Continuously variable transmissions of the class which may be broadly characterized as a transmission system in which a belt couples a pair of pulleys, at least one of which can assume a more or less continuous range of effective diameters, these types of transmission systems generally fall into two categories: (a) those systems employing V-belts or variations thereof (such as link belts or chains) for transmitting power from one pulley to the other and (b) those systems employing flat, flexible belts between variable diameter pulleys.

Those skilled in the art have come to appreciate that continuously variable transmissions capable of using flat belts have significant fundamental advantages over those systems employing V-belts. In the case of the latter, the belts are composed of various compositions and have a trapezoidal cross section. The belts transmit rotary motion at one speed from a source of power, such as an engine or motor, to an output shaft which rotates at a different speed, the speed ratio between the input speed received from the source and the output speed being varied in a continuous fashion from a minimum to a maximum dependent on the geometry of the belt and the pulley system. The V-belt is compressed between smooth, conical facing surfaces in each of the two pulleys by external axial forces. These axial forces apply a compressive force on the sides of the belts to prevent slippage. In operation, a displacement caused by the change in the axial loading on the conical surfaces causes the V-belt to change its radial positions in the two pulleys until a force balance is achieved or a limit range stop is reached.

For large transmitted torque, the axial forces exerted on the facing conical surfaces produce large compressive forces on the V-belt. This requires that the V-belt have a substantial thickness to prevent it from laterally collapsing. This thickness increases the centrifugal force acting on the belt and causes higher belt tension loads. In addition, as the belt thickness increases, the pulley size must be increased due to higher stress loads at a given minimum pulley radius. Further, the frictional forces acting on the sides of the V-belt tend to hold it to the facing conical surfaces, therefore, the V-belt must be continuously "pulled out" from between the conical surfaces upon leaving each of the pulleys. This results in significant friction losses and belt fatigue which adversely affects the overall efficiency of the V-belt system and its operating life. Consequently, although variable speed V-belt drives are being used in a wide variety of applications they are severely limited in their power transfer capabilities for small size equipment. Further, V-belts are generally not compatible with the serpentine belt systems used in automotive applications because their bending in a reverse direction is severely limited.

Because of these inherent drawbacks to the use of V-belts, the second category has been developed which is broadly designated as flat belt drive continuously variable transmissions. As the name suggests, flat belts may be employed between the driven and driving pulley assemblies which are dynamically variable in diameter to obtain the sought after ratio changes. No axial movement between the two pulley rims is necessary. On the other hand, it is necessary to somehow effect the diametric variations of the individual pulley assemblies. In one particularly effective system, this function is achieved by causing a circular array of drive elements in each pulley to translate radially inwardly or outwardly in concert to obtain a given effective diameter of the pulley assembly. Variable speed flat belt transmissions of this type and their associated control systems are disclosed in U.S. Pat. Nos. 4,295,836, 4,591,351, 4,714,452 and 4,768,996. All of these patents have been issued to Emerson L. Kumm. In all but the first patent enumerated above, the variable diameter pulleys include a pair of pulley rims between which extend a series of belt engaging elements that are simultaneously moved in a radial direction to change the effective diameter of the pulley.

Each pulley assembly includes two rim elements which are made up of two pairs of disks (designated, respectively, the inner disk members and the outer disk members) which are concentric with each other and disposed immediately adjacent one another. Each of the adjacent disk members has a series of spiral grooves or guideways. The guideways of one of the disks are oriented in the opposite sense to the guideways of the other. The ends of the belt engaging elements are captured at the intersections of the spiral guideways of the two adjacent disks. Thus, radial adjustment of the position of the belt engaging elements may be achieved by a relative rotation of displacement between the inner and outer disk members. This rotation being, of course, carried out simultaneously and in coordination with the disk on the other side of the pulley assembly.

The disclosures of the above identified patents to Emerson L. Kumm include control systems for effectively establishing the mutual angular relationship between the inner and outer disk members of each pulley assembly in the continuously variable transmission system. The mechanisms taught by the prior art cited above for establishing the mutual angular relationship between the inner and outer disk members has been relatively complex and expensive to manufacture. The present invention is directed to a simple mechanical mechanism for variably changing the relationship between the inner and outer disk members by means of axially directed forces.

SUMMARY OF THE INVENTION

The invention is a continuously variable transmission system having at least one variable diameter pulley assembly coupled by a belt to at least one other pulley in the system. The variable diameter pulley assembly has a plurality of belt engaging members arranged in a circle defining an effective diameter for the variable diameter pulley assembly. Each of the belt engaging members has a central shank and a pair of bearing sections longitudinally extending from the opposite ends of the central shank. The central shank is adapted to engage the belt. The pulley assembly further has a pair of spatially separated inner disk members disposed concentric with the axis of the circle formed by the belt engaging members. One of the inner disk members is positioned adjacent to one end of the central shank and the other of the inner disk members is positioned adjacent to the other end of the central shank. Each of the inner disk members have a plurality of guideways extending in a first direction and each of the guideways receives therethrough a respective bearing section of one of the belt engaging members.

The variable diameter pulley assembly also has a pair of outer disk members disposed concentric with the axis of the circle formed by the belt engaging members. Each of the outer disk members is in juxtaposition with one of the inner disk members on the side opposite the belt engaging members. Each of the outer disk members has a second plurality of guideways extending in a direction opposite the first direction. Each guideway of the second plurality of guideways intersects a respective one of the first plurality of guideways and receives therein a portion of the bearing section which extends through the guideways of the associated inner disk at the intersection. A hub connectable to a shaft has at least a first guide angularly disposed in a first direction relative to the axis of rotation. The hub is connected to either the two outer disk members or the two inner disk members. A drive member circumscribes the hub and has at least a second guide facing the first guide, the second guide being angularly disposed in a direction opposite the direction of the first guide. The second guide of the drive member crosses the first guide of the hub. The drive member is connected to the other of the aforementioned pair of outer disk members or the inner disk members. At least one actuator member simultaneously engages the first and the second guides at the point where they cross. An axially displaceable cage captivates the actuator member and is operative to displace the actuator member relative to the hub. The axial displacement of the actuator member displaces the axial location of the intersection of the first and second guides, causing the drive sleeve to rotate relative to the hub. The rotation of the drive sleeve relative to the hub rotates the pair of inner disk members relative to the outer disk members which radially displaces the belt engaging members to change the effective diameter of the pulley assembly.

The object of the invention is a continuously variable transmission system having at least one variable diameter pulley assembly in which the rotational displacement between the inner and outer disk members which determine the effective diameter of the variable diameter pulley assembly is controlled by an axially displaceable member.

Another object of the invention is a continuously variable transmission system in which the relative rotation of the inner disk members to the outer disk members of the variable diameter pulley assembly is provided by an actuator member received in a pair of crossing guideways.

Another object of the invention is a continuously variable transmission system in which the rotational position of the inner disk members relative to the outer disk members is controlled by an axial displacement of at least one pin captivated in a pair of crossing slots, one slot being provided in the hub of the pulley assembly and the other being provided in a drive member circumscribing the hub.

Another object of the invention is to provide a fluid actuator integral with the variable diameter pulley assembly to axially displace the pin along the crossing slots to change the effective diameter of the pulley assembly by changing the rotational position of the inner disk members relative to the outer disk members.

Still another object of the invention is a continuously variable transmission system in which the rotational position of the inner disk members relative to the outer disk members is controlled by the axial position of a plurality of balls captivated between a like plurality of crossing helical grooves which spiral in opposite directions, the first plurality of helical grooves being provided in the hub of the pulley assembly and the second plurality of helical grooves being provided in a drive member circumscribing the hub.

Still another object of the invention is to provide a fluid actuator integral with the variable diameter pulley assembly to axially displace the balls along the helical grooves to change the effective diameter of the pulley assembly by changing the rotational position of the inner disk members relative to the outer disk members.

These and other objects of the invention will become apparent from a reading of the specification in conjunction with the appended drawings.

BRIEF DESCRIPTION OF THE DRAWINGS

FIG. 1 is an end view of the continuously variable transmission system having two variable diameter pulley assemblies;

FIG. 2 is a cross-sectional view of the continuously variable transmission system taken along lines 2—2 of FIG. 1;

FIG. 5 is a cross-sectional view of the variable diameter pulley assembly;

FIG. 6 is a cross-sectional view of the variable diameter pulley assembly taken along lines 4—4 of FIG. 5;

FIG. 18 is an alternate embodiment of the fluid actuator shown in FIG. 17 in which the fluid actuator is disposed on the side of the pulley assembly adjacent to the input shaft; and FIG. 19 illustrates an alternate embodiment of the fluid actuator producing a linear displacement of a ball cage.

DETAILED DESCRIPTION OF THE PREFERRED EMBODIMENT

Figure 3:
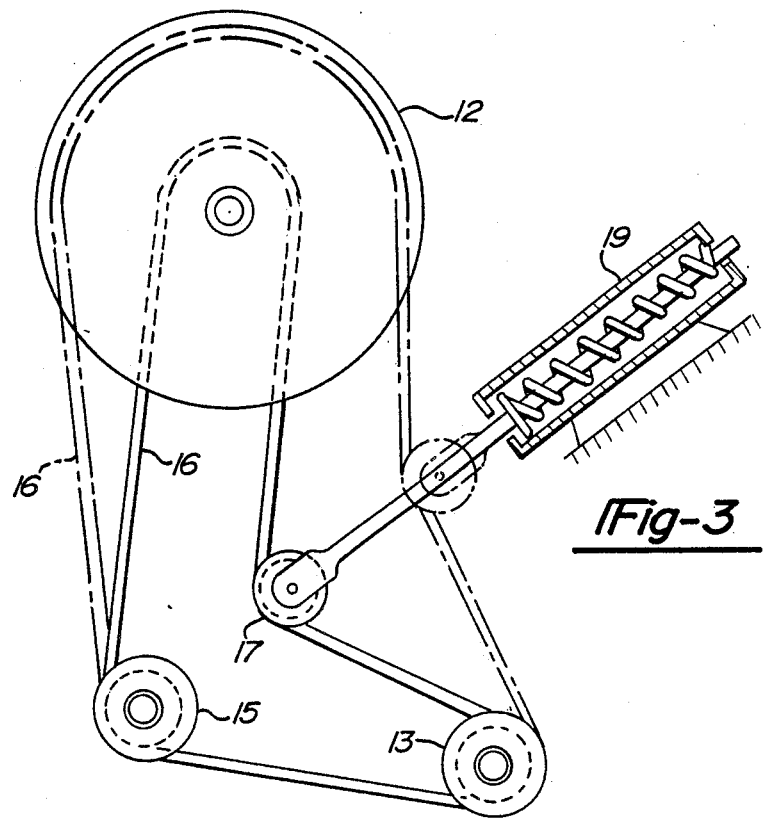
FIG. 3 shows a continuously variable transmission system having only a single variable diameter pulley assembly.

FIGS. 1 and 2 show the fundamental aspects of a belt driven continuously variable transmission system 10 having two variable diameter pulley assemblies 12 and 14 connected for relative rotation with each other by a drive belt 16. The drive belt 16 may be a flat belt, a conventional V-belt or a pulley V-belt as is known in the art.

In the illustrated embodiment, the variable diameter pulley assembly 12 will be the drive pulley and the variable diameter pulley assembly 14 will be the driven pulley. It is understood that the roles of these two pulley assemblies may be reversed without altering the basic concepts of the invention.

The pulley assembly 12 is mounted on a drive shaft 18 which is connected to a source of rotary power, such as an engine (not shown) of an automotive vehicle. The pulley 14 is connected to a driven shaft 20 which may be connected to the vehicle's transmission or one or more of the vehicle's accessories, such as the alternator, the radiator fan, the water pump, the fluid pump for steering or power brakes or an air compressor for a supercharging system. The structures of the variable diameter pulley assemblies 12 and 14 may be identical or may be different as shall be explained hereinafter. The structure of the variable diameter pulley assemblies 12 and 14 may be of the type shown in FIGS. 5 through 19, however, it is only necessary that one of the two variable diameter pulley assemblies 12 or 14 be of the type shown in FIGS. 5 through 19 and the other may be a variable diameter tensioner pulley assembly of the type disclosed in my co-pending patent application Ser. No. 07/365,605 entitled "A Continuously Variable Transmission System Having a Variable Diameter Pulley With Resiliently Biased Belt Engaging Members". In the variable diameter tensioner pulley, the effective diameter of the pulley assembly is an inverse function of the tension applied to the drive belt. With this arrangement, the effective diameters of the two variable diameter pulley assemblies 12 and 14 will change in an inverse manner so that as the effective diameter of one variable diameter pulley 12 or 14 increases, the effective diameter of the other decreases and vice versa.

In an alternate embodiment shown in FIG. 3, the continuously variable transmission system has only a single variable diameter pulley assembly 12 connected by a drive belt 16 to a fixed diameter pulley 13. Such a system will also include one or more idler pulleys, such as idler pulley 15, and a tensioner pulley 17. The tensioner pulley 17 is connected to a resilient actuator 19 which produces a force biasing the tensioner pulley 17 against the drive belt 16. The resiliently biased tensioner pulley 17 maintains predetermined tension on the drive belt as the effective diameter of the variable diameter pulley assembly 12 changes as shown in FIG. 3. In this embodiment, as with the embodiment shown in FIGS. 1 and 2, the rolls of the variable diameter pulley assembly 12 and the fixed diameter pulley assembly 13 are interchangeable. The variable diameter pulley assembly 12 or the fixed diameter pulley 13 may be the drive pulley and the other be the driven pulley without altering the basic concepts of the invention.

Figure 4:
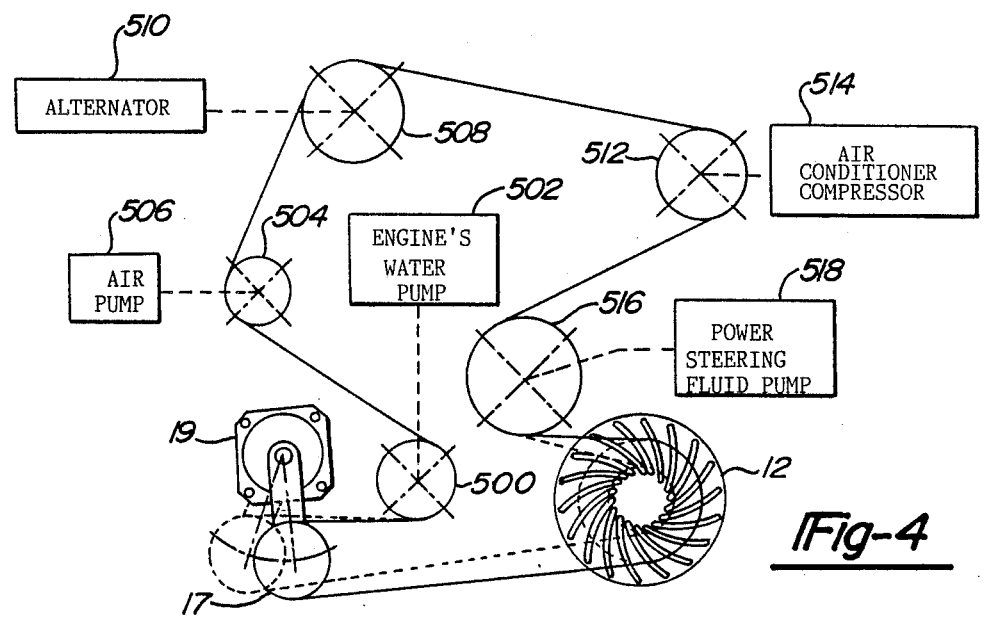
FIG. 4 shows a continuously variable transmission system having at least one variable diameter pulley and a plurality of driven devices.

FIG. 4 shows a typical automotive application of the continuously variable transmission system using at least one variable diameter pulley assembly 12. In this system, the drive belt 16 is connected to the tensioner pulley 17 which is resiliently biased by the actuator 19 which is functionally equivalent to the actuator 19 shown in FIG. 3. The drive belt 16 is connected to a series of pulleys 500, 504, 508, 512 and 516 in a serpentine pattern. The pulley 500 is connected to a water pump 502, the pulley 504 is connected to an air pump 506, the pulley 508 is connected to an alternator 510, the pulley 512 is connected to an air conditioner compressor 514 and the pulley 516 is connected to a power steering fluid pump 518. At least one of the pulleys 500, 504, 508, 512 and 516 may be identical to the variable diameter pulley 12 or may be a variable diameter tensioner pulley such as discussed relative to FIGS. 1 and 2. As would be obvious to those skilled in the art, when a second variable diameter pulley is included in the system, the tensioner pulley 17 and the actuator 19 may be omitted. However, in any particular application, the tensioner pulley 17 and the actuator 19 may be included even when the system includes a second variable diameter pulley.

The structure of a first embodiment of the variable diameter pulley assembly 12 will be described in detail relative to FIGS. 5, 6 and 7. The variable diameter pulley assembly 12 has a pair of circular end support members or side rims 22 and 24 disposed adjacent to each other and concentric with the drive shaft 18. A series of equally spaced belt engaging elements 26 as shown in FIGS. 5 and 6 have their opposite ends attached to the ends of the support members 22 and 24 and form a circular rim which is engaged by the drive belt 16. The diameter of the circular rim formed by the belt engaging elements 26 is the effective diameter of the variable diameter pulley assembly. The belt engaging elements 26 are radially displaceable to vary (change) the effective diameter of the pulley as shall be explained hereinafter. As shown in FIG. 6, each belt engaging element 26 has a central shank portion 28, which engages the drive belt 16, and a bearing section 30 at each end which is captivated in the end support members.

The end support member 22 consists of an inner disk member 32 in juxtaposition and parallel to an outer disk member 34. In a like manner, the end support member 24 consists of an inner disk member 36 in juxtaposition and parallel to the outer disk member 38. The axial spacing between the inner disk members 32 and 36 is fixed and does not change with the radial displacement of the belt engaging elements 26 to change the effective diameter of the pulley assembly. This axial spacing is sufficient to accommodate the belt engaging elements 26 which support the drive belt 16 with sufficient clearance.

The limits of the effective diameter of the variable diameter pulley assembly 12 by the radial displacement of the belt engaging elements 26 are depicted in FIG. 2.

From their initial position, as shown in FIG. 2, the belt engaging elements of the variable diameter pulley assembly 12 may be radially displaced outwardly to increase the effective diameter of the variable diameter pulley assembly 12 and the drive belt 16 will assume the position shown in phantom. In a reverse manner, the belt engaging elements 26 of the driven pulley assembly 14 simultaneously will be displaced radially inwardly from the initial position shown decreasing the effective diameter of the pulley assembly 14. When the effective diameter of pulley assembly 14 has its minimum value the drive belt 16 will assume the position shown in phantom in FIG. 2.

The radial displacement of the belt engaging elements 26 is achieved by the rotary displacement of the inner disk members 32 and 36 relative to their associated outer disk members 34 and 38, respectively. As taught by Kumm in U.S. Pat. No. 4,295,836, the outer disk members 34 and 38 each have a plurality of guideways 40 which extend outwardly in a first direction. In a similar manner, the inner disk members 32 and 36 each have a like plurality of guideways 42 which extend outwardly in a direction opposite the direction of the guideways 40. For example, the guideways 40 of the pulley assembly 12 may curve or spiral outwardly in a counterclockwise direction as shown in FIG. 2 while the guideways 42 will curve or spiral outwardly in a clockwise direction. The guideways 40 and 42 will cross each other and at the locations at which the guideways 40 and 42 cross each other an aperture is formed into which the bearing section 30 of the belt engaging elements 26 are received. As is obvious from this structural relationship, the crossings of the guideways 40 and 42 will move in a radial direction with the rotational displacement of the inner disk members relative to the outer disk members and vice versa. In FIG. 2 for example, the counterclockwise rotation of the inner disk member 36 of the variable diameter pulley assembly 12 relative to the outer disk member 38 will cause the apertures formed at the crossings of the guideways 40 and 42 to move radially outwardly from the drive shaft 18. Since the bearing sections 30 of the belt engaging elements 26 are supported within these apertures, the belt engaging elements will also move radially outwardly increasing the effective diameter of the variable diameter pulley assembly.

Conversely, when the inner disk member 36 of the variable diameter pulley assembly 12 is rotated in a clockwise direction relative to the outer disk member 38, the apertures formed at the crossings of the guideways 40 and 42 will move radially inwardly decreasing the effective diameter of the variable diameter pulley assembly 12.

Preferably, the shape of the guideways 40 and 42 are contoured, as taught by Kumm in U.S. Pat. No. 4,295,836, so that they intersect at a 90° angle. It will be understood that the guideways 40 and 42 may have other shapes so long as the bearing sections 30 of the belt engaging elements 26 supported in the apertures formed by the intersection of the guideways 40 and 42 will move in a generally radial direction when the inner and outer disk members are rotated relative to each other.

To assure that the opposite ends of the belt engaging elements 26 move together in a uniform manner, the inner disk members 32 and 36 of each pulley assembly are connected to each other so that they rotate together as a unit. In a like manner, the outer disk members 34 and 38 are also connected to each other so that they rotate as a unit also.

Referring now to FIGS. 5 and 6, the details of a first embodiment of the variable diameter pulley assembly, such as pulley assembly 12, are shown. As previously described, the pulley assembly 12 has a pair of end support members 22 and 24. The outer disk members 34 and 38 of the end support members 22 and 24 are fixedly attached to a hub 44 having a mounting bore 46 for receiving the shanked end 48 of a shaft, such as the drive shaft 18. The mounting bore 46 and the shanked end 48 of the drive shaft may have a mating key slot provided therein to receive a key 50 to lock the hub 44 to the drive shaft 18 for rotation therewith. The hub 44 is secured to the end of the drive shaft 18 by a bolt 52 received in a threaded bore 54 provided in the end of the drive shaft 18.

The hub 44 also has an axially disposed cage bore 56 provided in the end opposite the mounting bore 46. The cage bore 56 slidably receives a pin cage assembly 58 which has a cylindrical pin cage 60 and at least one actuator pin 62 radially extending therefrom. In the preferred embodiment, the pin cage assembly 58 has three equally spaced actuator pins 62 extending into a like number of pin guides, such as helical slots 64, provided through the wall of a cylindrical portion 70 of the hub 44 as shown in FIG. 6. However, the pin cage assembly 58 may alternately have two diametrically opposed actuator pins 62 or four actuator pins in a cruciform pattern. The actuator pins 62 are secured in the pin cage 60 by a spring ring 66 which engages an annular groove 68 provided in the actuator pins 62 adjacent to their ends, as shown.

The inner disk members 32 and 36 are connected to an inner disk drive member 72 rotatably received over the cylindrical portion 70 of the hub 44. The inner disk members 32 and 36 are attached to the inner disk drive member 72 which supports them in juxtaposition and parallel to the outer disk members 34 and 38, respectively, as shown. A like number of pin guides, such as helical slots 74, are also provided through a wall of the inner disk drive member 72 which are angularly disposed to the helical slots 64. Each of the helical slots 74 crosses an associated helical slot 64 provided through the wall of the cylindrical portion 70 of the hub. Each crossing of the two helical slots 64 and 74 form a through aperture receiving therein one of the actuator pins 62 as shown in FIG. 7.

It is recognized that the disk drive member 72 may have the pin guides provided through a flat surface tangent to the hub 44 rather than the helical slots shown in FIG. 5 without affecting the operation of the variable diameter pulley assembly.

Figure 7:
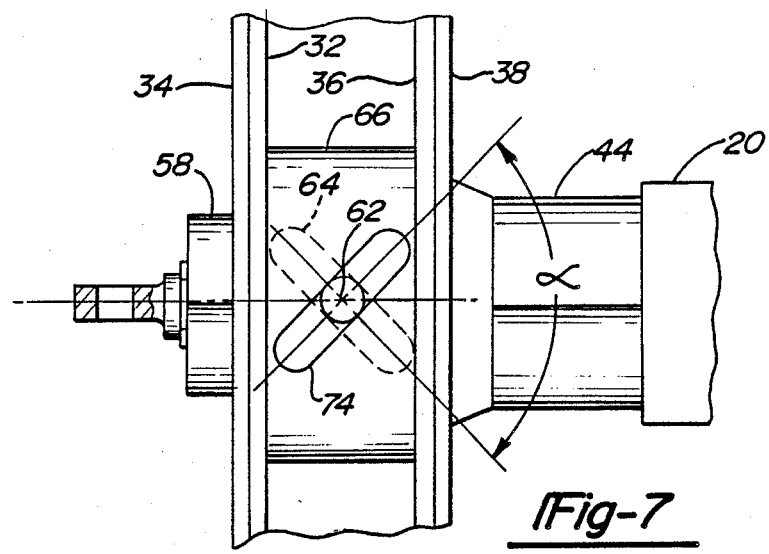
FIG. 7 is a partial top view of the variable diameter pulley assembly showing the relationship of the spiral slots.

In FIG. 7, the belt engaging elements have been omitted to show more clearly the crossing relationship of the two slots 64 and 74 to each other. The angle alpha between the two slots 64 and 74 is selected so that when the pin cage assembly 58 is axially displaced relative to the hub 44, the actuator pin 62 disposed in the crossing slots 64 and 74 will cause the inner disk drive member 72 to rotate relative to the hub 44. Because the outer disk members 34 and 38 are attached to the hub 44 and the inner disk members 32 and 36 are attached to the inner disk drive member 72, the rotation of the inner disk drive member 72 relative to the hub 44 produces a like rotation of the inner disk members 32 and 36 relative to their adjacent outer disk members 34 and 38.

The length of the two slots 64 and 74 and the angle between them are selected so that when the actuator pins 62 are axially displaced from one end of the slots 64 and 74 to the other end, the rotation of the inner disk members 32 and 36 relative to the outer disk members 34 and 38 is sufficient to displace the belt engaging elements 26 from their innermost radial position to their outermost radial position by the guideways 40 and 42.

Figure 8:
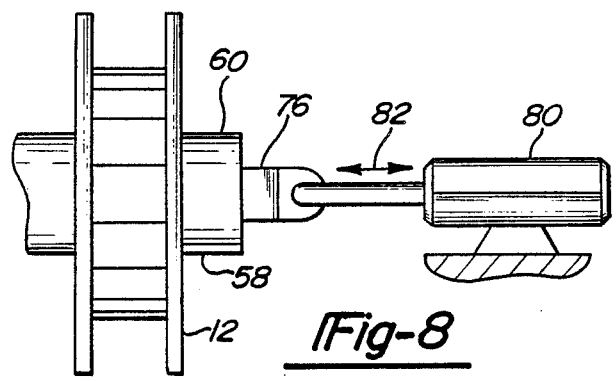
FIG. 8 shows a variable diameter pulley assembly connected to a linear actuator.

The pin cage assembly 58 further has a connector member 76 which permits the pin cage 60 to be connected to an external actuator 80, as shown in FIG. 8. A thrust bearing 78 rotatably connects the connector member 76 to the pin cage 60. The thrust bearing 78 decouples the connector member 76 from the rotation of the pin cage 60 while providing for an axial displacement of the pin cage 60 and the actuator pin 62 in response to an axial displacement of the connector member 76 by the actuator to which it is connected.

Figure 9:
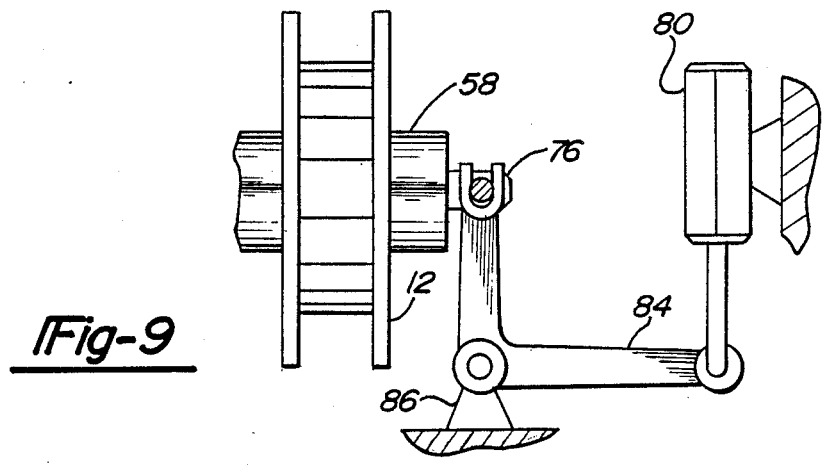
FIG. 9 shows a variable diameter pulley assembly connected to an actuator by means of a L-shaped lever.

The actuator 80 may be a hydraulic actuator, a pneumatic actuator, a solenoid, an electric motor, or a mechanical actuator. The actuator 80 may be controlled manually, hydraulically, pneumatically or by an electrical control system (not shown). As shown in FIG. 8, the actuator 80 may be connected directly to the connector member 76 of the variable diameter pulley assembly and is capable of producing a force axially displacing the pulley assembly's pin cage assembly 58 inwardly or outwardly as indicated by the doubled headed arrow 82. Alternately, as shown in FIG. 9, the actuator 80 may be connected to the connector member 76 through a mechanical link mechanism, such as an "L" shaped lever 84 which is pivotable about a stationary pivot mount 86.

Figure 10:
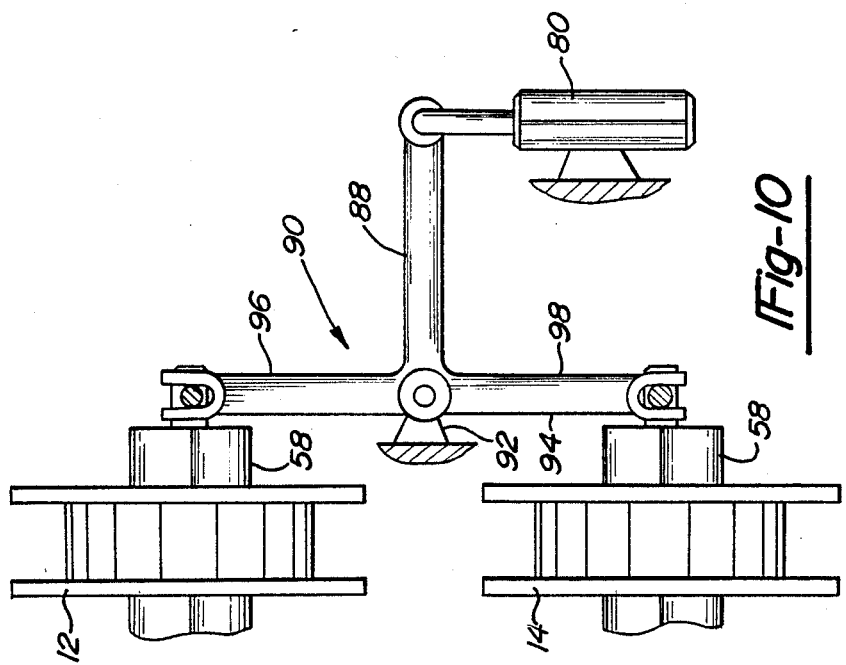
FIG. 10 shows two variable diameter pulley assemblies connected to a single actuator by means of a T-shaped lever.

In a continuously variable transmission system such as shown in FIGS. 1 and 2, in which both pulley assemblies 12 and 14 are of the type shown in FIGS. 5 and 6, they may individually have their own actuator 80 and mechanical link mechanism. However, as shown in FIG. 10, a single actuator 80 may simultaneously displace the pin cage assembly 58 of the pulley assembly 12 and the pulley assembly 14 in opposite directions. In this arrangement, the actuator 80 acts upon a centrally disposed leg 88 of a "T" shaped mechanical link 90 which is pivotable about a stationary pivot mount 92 at the intersection of the centrally disposed leg 88 with a cross bar 94 having normally disposed arms 96 and 98. It is obvious that if the length of both arms 96 and 98 are equal, the displacement of the pin cage assembly 58 of the pulley assemblies 12 and 14 will be equal but in opposite directions so that when the belt engaging elements 26 of one of the pulley assemblies are moving in an outward direction, the belt engaging members of the other pulley assembly will move inwardly at the same time.

Figure 11:
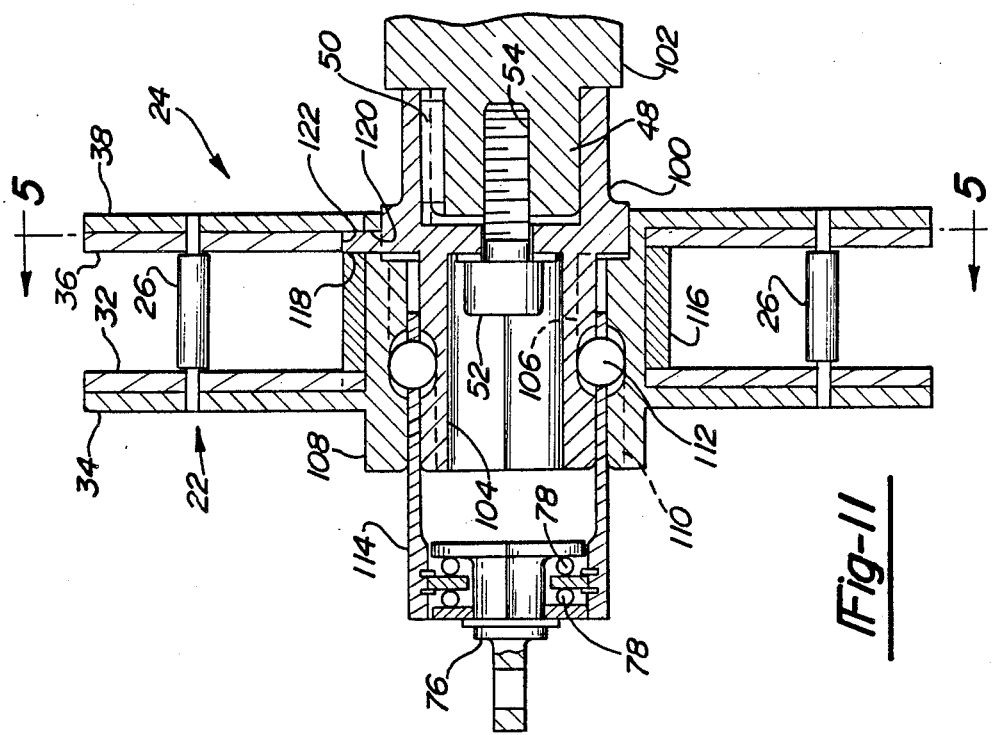
FIG. 11 is a cross-sectional view of an alternate embodiment of the pulley assembly having opposed spiral grooves and a ball inserted in the intersection of the spiral grooves.

An alternate embodiment of the pulley assembly 12 is shown in FIG. 11. In this embodiment, a hub 100 is connected to the shank end 48 of a shaft 102 by the bolt 52 threadably received in the threaded bore 54. The shaft 102 may be either a drive shaft 18 or a driven shaft 20, as illustrated in FIGS. 1 and 2. The key 50, received in mating key slots provided in the hub and the shank end of the shaft 102 rotationally locks the hub to the shaft 102. The hub 100 has a cylindrical extension 104 which has a plurality of helical grooves 106 formed in its external surface. The helical grooves 106 correspond structurally and functionally to the helical slots 64 of the embodiment shown in FIG. 5.

The outer disk members 34 and 38 are connected to an outer disk drive member 108 circumscribing the cylindrical extension 104 of the hub 100. The outer disk drive member 108 has a like plurality of grooves 110 which correspond to the slots 74 of the embodiment illustrated in FIG. 5. The grooves 110 are preferably helical grooves formed on the inner surface of the disk drive member 108. The helical grooves 106 and 110 face each other and spiral in opposite directions so that they cross each other in the same manner as the slots 64 and 74 cross each other as shown in FIG. 7. A plurality of balls 112 equal in number to the number of helical grooves are captivated between the hub 100 and the outer disk drive member 108 at the location where the helical grooves 106 and 110 cross each other. A cage 114 slidably received between the cylindrical extension 104 of the hub 100 and the outer disk drive member 108 captivates the balls 112 for axial displacement therewith. The connector member 76 is rotatably connected to the cage 114 by the thrust bearing 78. As with the first embodiment, the thrust bearing 78 decouples the connector member 76 from the rotation of the cage 114 which is rotatably connected to the hub 100 by the balls 112 in the intersection of the crossing grooves 106 and 110.

The inner disk members 32 and 36 are attached to a common spacer member 116 which supports them in juxtaposition and parallel to the outer disk members 34 and 38, respectively. The inner disk members 32 and 36 and outer disk members 34 and 38 have guideways corresponding to the guideways 40 and 42 illustrated in FIG. 2.

Figure 12:
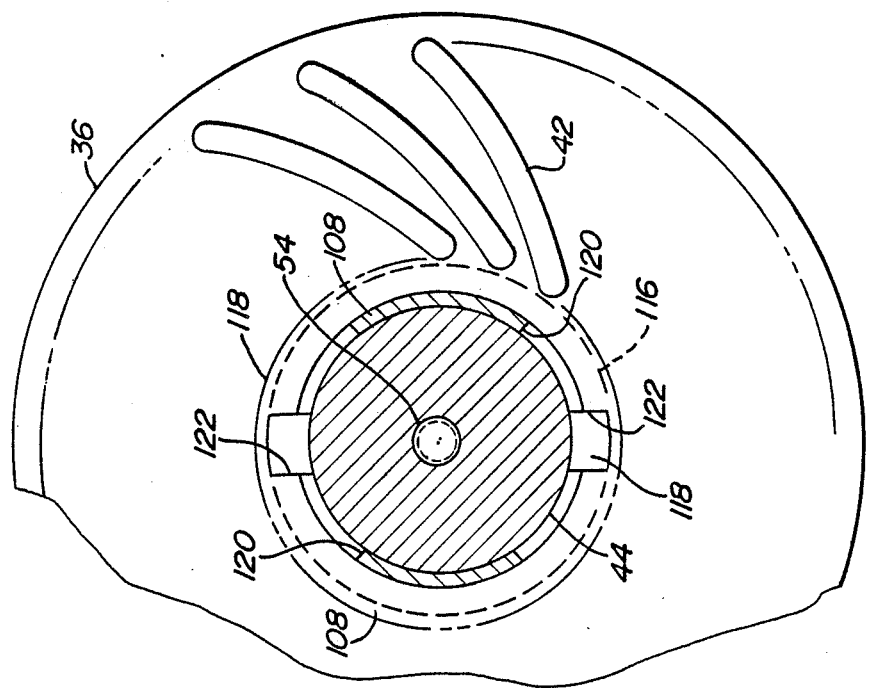
FIG. 12 is a cross-sectional view of the embodiment shown in FIG. 11 taken along lines 5—5.

The hub 100 has at least one tab 118, as best shown in FIG. 12, which extends through an arcuate slot 120 provided through the outer disk drive member 108 and is received in a mating slot 122 provided in the inner disk member 36. In the preferred arrangement, shown in FIG. 12, the hub 100 has two diametrically opposite tabs 118, each of which is received in a mating slot 122 provided in the inner disk member 36. As shown in FIG. 12, the width of the arcuate slots 120 is substantially greater than the width of the tabs 118 permitting a required angular displacement between the hub 100 and the outer disk drive member 108. The annular displacement between the outer disk drive member 108 and the hub 100, allowed by the arcuate slot 120, is sufficient to permit the belt engaging elements 26 attached to the inner and outer disk members to be displaced from their innermost position to their outermost position and vice versa.

The operation of the embodiment shown in FIGS. 11 and 12 is substantially the same as the embodiment shown in FIG. 5. In response to an annular displacement of the cage 114, the balls riding in the crossing helical grooves 106 and 110 will rotate the inner disk members 32 and 36 relative to the outer disk members 34 and 38. The rotation of the inner disk members 32 and 36 and outer disk members 34 and 38 relative to each other will cause the belt engaging elements 26 to be radially displaced changing the effective diameter of the pulley assembly.

Figure 13:
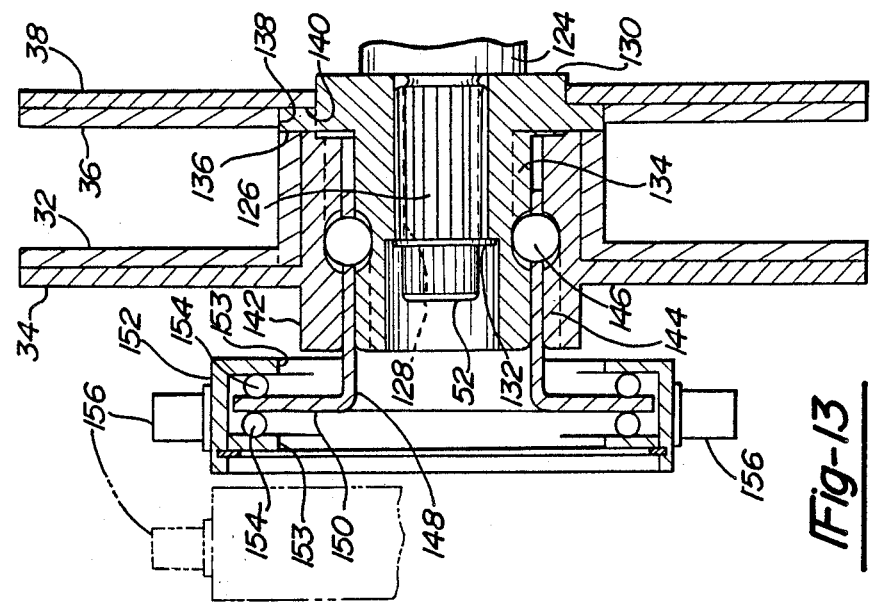
FIG. 13 is a cross-sectional view of an alternate embodiment of the pulley assembly shown in FIG. 11.

FIG. 13 shows an alternate configuration of the cage and the hub of the pulley assembly. In this embodiment, a shaft 124 has a male spline 126 provided at its end which mates with a female spline 128 concentric with the axis of a hub 130. The bolt 52 and a washer 132 secures the hub 130 to the shaft 124. The hub 130 has a plurality of helical grooves 134 corresponding to the helical grooves 106 of the embodiment shown in FIG. 11 and at least one radial tab 136 which engages a mating slot 138 provided in the the inner disk member 36 through an arcuate aperture 140 provided through an outer disk drive member 142. The outer disk drive member 142 has a like plurality of helical grooves 144 which spiral in a direction opposite of the direction of the helical grooves 134 so that they cross each other at locations which lie in a plane normal to the axis of rotation. A ball 146 is disposed in each crossing of the helical grooves 134 and 144. A ball cage 148 captures the balls 146 for axial displacement therewith.

The ball cage 148 has a radial flange 150 which rotatably supports a connector rim 152. Ball bearings 154 disposed between the radial flange 150 and annular sidewalls 153 of the connector rim 152 decouple the connector rim 152 from the rotation of the ball cage 148. A pair of connector pins 156 are attached to the connector rim 152 to facilitate the coupling of an actuator, such as the actuator 80, to the connector rim 152.

The operation of this embodiment is identical to the operation of the embodiment shown in FIG. 11.

Figure 14:
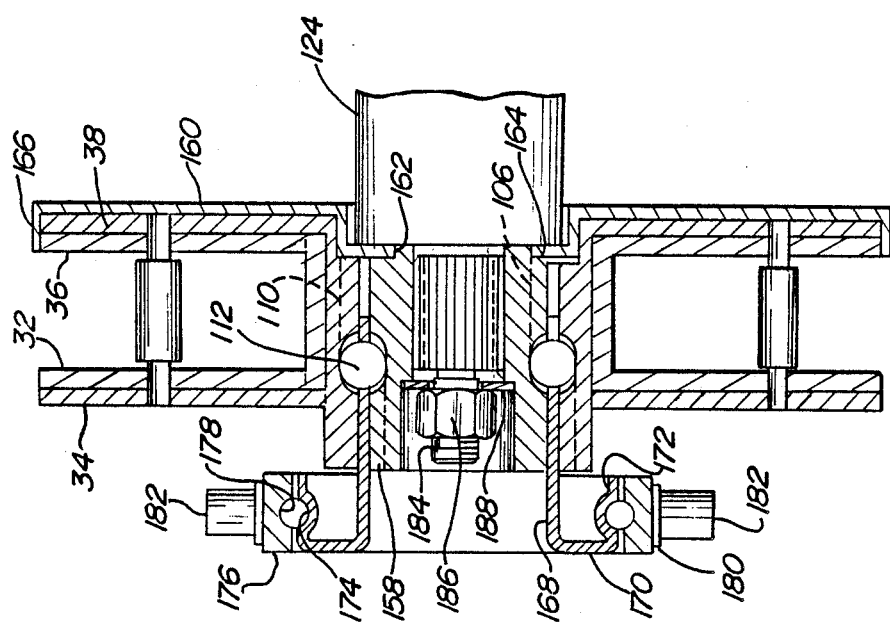
FIG. 14 is a further embodiment of the pulley assembly shown in FIG. 11 in which the inner disk members are connected to the hub assembly.

FIG. 14 shows a still further embodiment of the variable diameter pulley assembly. In this embodiment, the inner disk member 36 is connected to a hub 158 by means of a radial flange 160. The radial flange 160 is disposed adjacent to the outer disk member 38 on the side opposite the inner disk member 36, as shown. The radial flange 160 has a central aperture 162 which is attached to an annular seat 164 provided on the hub 158. The other end of the radial flange 160 has a cylindrical rim 166 which extends over the peripheral edge of the outer disk member 38 and is connected to the peripheral edge of the inner disk member 36. The edge of the inner disk member 36 may be attached to the cylindrical rim 166 by means of screws, bolts, welding, brazing or any other method known in the art. This arrangement eliminates the tabs 118, the mating slots 122 in the outer disk member, and the arcuate slots 120 through the outer disk drive member 108 to secure the inner disk members 32 and 36 to the hub.

A ball cage 168 captivates the balls 112 for axial displacement therewith. The ball cage 168 has a radial flange portion 170 and a cylindrical rim portion 172 external to the hub 158. The cylindrical rim portion 172 has a concave groove 174 forming an inner race for a ball bearing 180. An annular connector member 176 has a concave groove 178 forming the outer race for the ball bearings 180, such that a plurality of ball bearings 180 disposed in the concave grooves 174 and 178 rotatably support the connector member 176 about the cylindrical rim 172. The ball bearings 180 in the concave grooves 174 and 178 decouple the annular connector member 176 from the rotation of the ball cage 168 as in previous embodiments. The annular connector member 176 has a pair of journals 182 to which an actuator, such as an actuator 80, may be connected.

The hub 158 has a female spline which mates with a male spline provided on the end of the shaft 124 as described with reference to FIG. 11. In this embodiment, the shaft 124 has a threaded end portion 184 which receives a nut 186 and washer 188 to secure the pulley assembly to the shaft. The balls 112 are captivated in crossing helical grooves, such as the helical grooves 106 and 110 discussed relative to FIG. 11.

Figure 15:
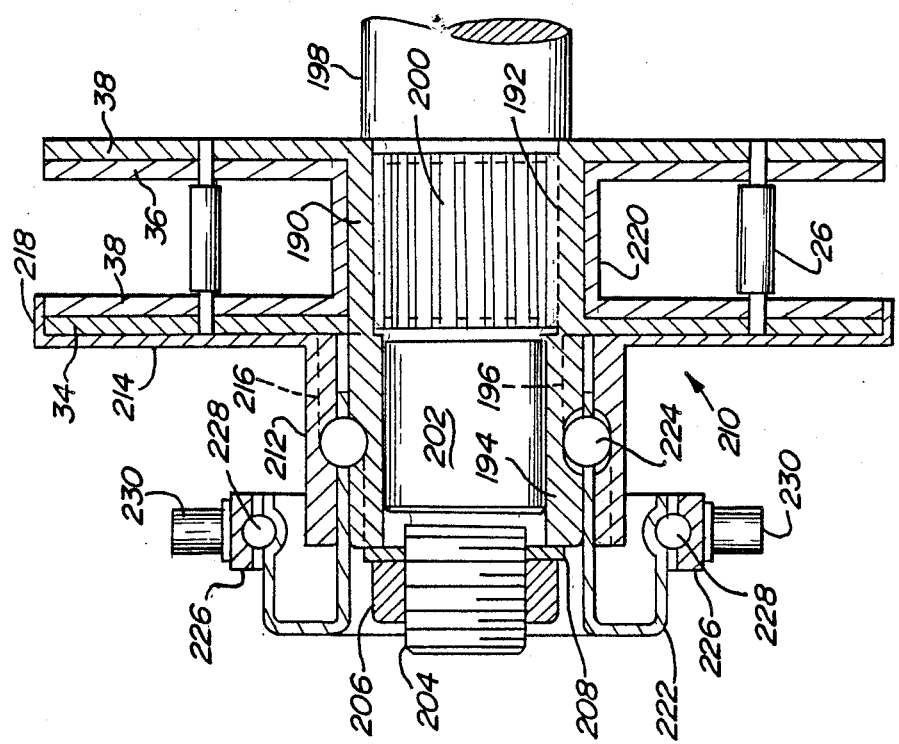
FIG. 15 is an alternate embodiment of the pulley assembly shown in FIG. 11 in which the outer disk members are connected directly to the hub.

The embodiment shown in FIG. 15 differs from the embodiment shown in FIGS. 11 through 14 in that the outer disk members 34 and 38 are connected directly to a hub 190. The hub 190 has a male spline 192, a cylindrical extension 194 and a helical groove 196 provided in the external surface of the cylindrical extension 194. A shaft 198 has a female spline 200 mating with the hub's male spline 192, a shank portion 202 extending substantially the length of the hub's cylindrical extension 194 and a threaded portion 204 extending external to the hub's cylindrical extension 194. A nut 206 and a washer 208 secure the hub 190 to the end of the shaft 198.

An inner disk drive member 210 has a cylindrical portion 212 and a radial flange 214 adjacent to the outer disk member 34. The cylindrical portion 212 has a helical groove 216 provided on its internal surface which spirals in the direction opposite of the hub's helical groove 196. As in previous embodiments, the helical grooves 196 and 216 are in opposite directions and cross each other. The radial flange 214 has a peripheral rim portion 218 which extends over the edge of the outer disk member 34 and is connected to the peripheral edge of the inner disk member 32. The inner disk members 32 and 36 are connected by a cylindrical spacer 220 which rotatably circumscribes the hub 190 so that they will rotate together with the rotation of the inner disk drive member 210.

A cage 222, which is similar to the cage 168 shown in FIG. 14, captivates a plurality of balls 224 which are received in the intersections of the spiral grooves 196 and 216. A connector rim 226 is rotatably supported from the cage 222 by a plurality of ball bearings 228. The connector rim 226 has a pair of journals 230 to which an actuator, such as an actuator 80, may be connected.

The operation of this embodiment is identical to the embodiment shown in FIGS. 11 through 14. Again, an axial displacement of the cage 222 will produce a rotational displacement of the inner disk drive member 210 with respect to the hub 190. Since the outer disk members 34 and 38 are connected to the hub 190 and the inner disk members 32 and 36 are connected to the inner disk drive member 210, they will also be rotationally displaced relative to each other causing the belt engaging elements 26 to be displaced inwardly and outwardly as previously described.

Figure 16:
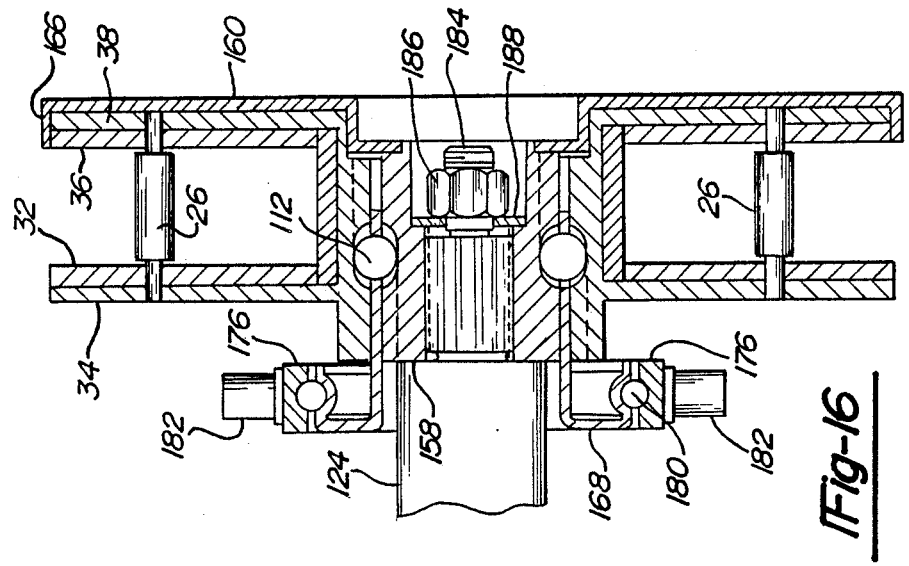
FIG. 16 is an alternate embodiment of the pulley assembly shown in FIG. 11 in which the annular connector rim is disposed on the shaft side of the pulley assembly.

The embodiment shown in FIG. 16 is identical to that shown in FIG. 14 except that the hub's female spline is provided at the end of the hub 158 opposite the end shown in FIG. 14. This change permits the pulley assembly to be attached to the shaft 124 with the external portion of the cage 168 and the annular connector member 176 extending back over the shaft 124. The operation of this embodiment is the same as the embodiments of the pulley assembly shown in FIG. 14.

Figure 17:
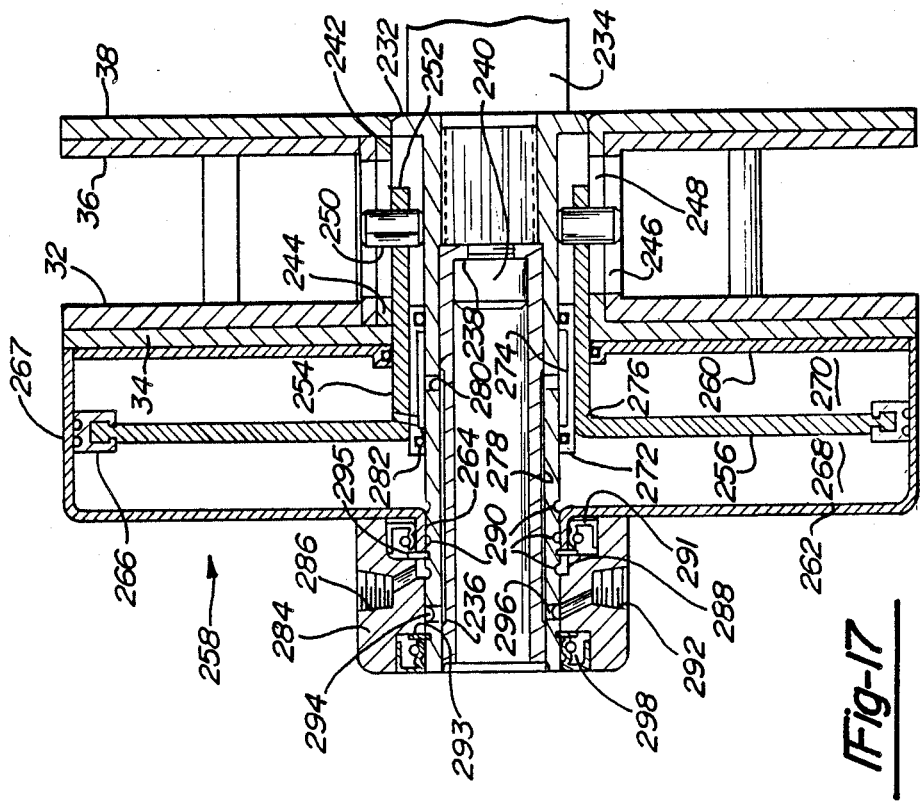
FIG. 17 is an embodiment of the pulley assembly shown in FIG. 15 having an integral fluid actuator.

As shown in FIG. 17, a fluid actuator may be incorporated directly into the pulley assembly eliminating the need for an external actuator such as the actuators 80 shown in FIGS. 8 and 9. The fluid actuator may be either a hydraulic or a pneumatic actuator. Referring to FIG. 17, a cylindrical hub 232 has a male spline at one end which is engaged by a female spline provided at the end of the shaft 234. A sleeve 236 is received in the hub 232 at the end opposite the male spline and fixedly sealed therein by welding, brazing or any other known method. An annular flange 238 is provided at the end of sleeve 236 which defines a shoulder for a bolt 240 which secures the sleeve 236 and the hub 232 to the shaft 234.

The outer disk members 34 and 38 are connected to an outer disk drive member 242 which circumscribes a portion of the hub 232. The outer disk drive member 242 is connected to the hub 232 and rotates therewith. The inner disk members 32 and 36 are connected to a cylindrical inner disk drive member 244 which supports the inner disk members 32 and 36 adjacent to the outer disk members 34 and 38. The inner and outer disk drive members 244 and 242 each have helical slots 248 and 246, respectively. As in the embodiment shown in FIG. 5, the helical slots 246 and 248 spiral in opposite directions and cross each other to form through apertures for radially disposed pins 250. The pins 250 are captivated by a pin cage 252 which is operative to axially displace the pins 250 along the helical slots 246 and 248. The pin cage has a linear portion 254 and a radial flange 256 which functions as a piston for the fluid actuator.

The radial flange 256 disposed normal to the axis of the hub 232 is enclosed by an actuator housing 258 which consists of a radial member 260 which is adjacent to the outer disk drive member 242 and a cup-shaped cover 262 which is sealingly connected to the radial member 260 about its periphery to form an enclosed chamber. The bottom of the cup-shaped cover 262 has a flared central aperture 264 which is connected to the hub 232.

A peripheral fluid seal 266 is attached to the edge of the radial flange 256 which engages the inner surface of a rim portion 267 of the cup-shaped cover 262. The radial flange 256 and seal 266 divide the interior of the actuator housing 258 into two annular fluid chambers 268 and 270.

A spacer sleeve 272 attached to the linear portion 254 of the pin cage 252 circumscribes the hub 232. The spacer sleeve has an annular recess 274 which is in fluid communication with the fluid chamber 270 through a fluid passageway 276 provided through the spacer sleeve 272 and the linear portion 254 of the pin cage. The annular recess 274 is also in fluid communication with an elongated annular recess 278 provided in the sleeve 236 through a fluid passageway 280. An annular fluid seal 282 is provided at each end of the spacer sleeve 272 sealingly engage the outer surface of the hub 232. A fluid coupling 284 is rotatably connected to the end of hub 232 opposite the shaft 234. The fluid coupling 284 has a first fluid port 286 which is connected to the fluid chamber 268 through an annular groove 288 and a helical groove 290. The fluid coupling 284 further has a second fluid port 292 which is connected to the annular recess 278 in the sleeve 236 through an annular groove 294 provided in the hub 232 and a fluid passageway 296 connecting the annular groove 294 with the annular recess 278. The fluid coupling 284 is captivated on the hub by a pair of snap rings 293 and 295 as shown. Fluid seals 298 and 291 are provided to seal the fluid coupling 284 to the hub 232 on opposite sides of the first and second fluid ports 286 and 292 and their associated annular grooves 288 and 294.

In operation of the pulley assembly, the introduction of a pressurized fluid through the first fluid port 286 will enter the fluid chamber 268 through the helical groove 290 and produce a force urging the radial flange 256 of the pin cage 252 towards the shaft 234. The displacement of the pins 250 by the pin cage 252 will cause the inner disk members 32 and 36 to rotate relative to the outer disk members 34 and 38. Alternatively, the introduction of a pressurized fluid through the second fluid port 292 pressurizes the fluid chamber 270 through the annular recess 278, the fluid passageway 280, the annular recess 274 and the fluid passageway 276. The pressure in the fluid chamber 270 will produce a force on the radial flange 256 of the pin cage 252 displacing the pin cage away from the shaft 234. The displacement of the pins 250 by the pin cage 252 will cause the inner disk members 32 and 36 to rotate in an opposite direction relative to the outer disk members 34 and 38. The rotation of the inner disk members 32 and 36 relative to the outer disk members 34 and 38 will radially displace the belt engaging elements 26, as previously described, to change the effective diameter of the variable diameter pulley assembly.

It is to be understood that the variable diameter pulley assembly could have a structure corresponding to the embodiments shown in FIGS. 12, 13, 14 and 15 having a ball and ball cage rather than pins and a pin cage as described with reference to FIG. 17. Further, in view of the embodiment shown in FIG. 16, the fluid actuator which consists of the actuator housing 258 and the radial flange 256 may be disposed on the opposite side of the pulley assembly as shown in FIG. 18. In this embodiment, the actuator housing 258 is disposed between a shaft 299 and a pulley assembly 300. A fluid coupling 302 is rotatably attached to the end of the hub assembly and has a pair of fluid ports which supply fluid to the fluid chambers 268 and 270. The hub assembly consists of a hub 304 and three concentric sleeves, an outer sleeve 306, an intermediate sleeve 308, and an inner sleeve 310 sealingly connected to each other at their opposite ends. One end of the outer sleeve 306 is attached to the hub 304. The inner sleeve 310 has an elongated annular recess 312 which is connected to a first fluid port 316 through a first fluid passageway 318 which connects with a first annular groove 320 provided in the fluid coupling 302. The first annular groove 320 is connected to the first fluid port 316. The other end of the first annular groove 312 is connected to the fluid chamber 270 through a second fluid passageway 322 which passes through the intermediate and outer sleeves 308 and 306.

The intermediate sleeve 308 also has an elongated annular recess 314 which is connected at one end to a second fluid port 324 through a third fluid passageway 326 and a second annular groove 328 provided in the fluid coupling. The second annular groove 328 is connected to the second fluid port 324. The other end of the annular recess 314 is connected to the fluid chamber 268 through a fourth fluid passageway 330 and a fifth fluid passageway 332 which passes through a cage spacer 334 and a pin cage 336. The cage spacer 334 is attached to the pin cage 336 and moves therewith. The cage spacer 334 has an annular recess 338 which remains in fluid communication with the fourth fluid passageway 330 as pins 340 are displaced between their extreme positions by the pin cage 336. As in the embodiment shown in FIG. 3, the pins 340 extend through crossing slots 344 and 356 associated with the inner and outer disk drive members.

A fluid pressure applied to the first fluid port 316 will displace a radial flange 342 of the pin cage 336 away from the shaft 299. The pin cage 336 will axially displace the pins 340 causing the outer disk members 34 and 38 to rotate in a predetermined direction relative to the inner disk members 32 and 36. The inner disk members 32 and 36 are connected to the hub 304 by the cup-shaped cover 262 of the actuator housing 258.

A fluid pressure applied to the second fluid port 324 will displace the radial flange 342 of the pin cage 336 towards the shaft 299. The pin cage 336 will axially displace the pins 340 causing the outer disk members 34 and 38 to rotate in the opposite direction. The rotary displacement of the outer disk members 34 and 38 relative to the inner disk members 32 and 36 will radially displace the belt engaging elements 26 to change the effective diameter of the pulley assembly 300.

FIG. 19 illustrates an alternate embodiment of the fluid actuator for the variable diameter pulley assembly. In this embodiment, a hub 348 and cylindrical extension 350 are attached to a shaft 352 by means of a bolt 354. The shaft 352 in this embodiment, as well as any of the previously described embodiments, may drive a shaft, such as the drive shaft 18 in FIGS. 1 and 2, or may be a driven shaft, such as the driven shaft 20. Also, the cylindrical extension 350 and the hub 348 may be a unitary member or may be separate members as shown. The inner disk members 32 and 36 are connected to a common spacer sleeve 356 so that they will rotate together. The inner disk member 32 is connected to a cup-shaped actuator housing 358 which is attached to the cylindrical extension 350 while the inner disk member 36 is attached to the hub 348 by a radial flange 360. The actuator housing 358 and radial flange 360 may be attached to the inner disk members 32 and 36 by screw type fasteners 362 as shown, by welding, brazing or any other method known in the art.

The outer disk members 34 and 38 are attached to an outer disk drive member 364 which supports the outer disk members 34 and 38 adjacent to their respective inner disk members 32 and 36. The outer disk drive member 364 has a plurality of helical grooves 366 which cross a like plurality of helical grooves 368 provided in the hub 348. As in the previous embodiments, the helical grooves 366 and 368 spiral in opposite directions and cross each other at least one location. A ball 370 is disposed in the helical grooves 366 and 368 at the locations where they cross each other. The axial location of the balls 370 determines the rotational position of the outer disk drive 364 relative to the hub 348.

A cage member 372 has a cylindrical portion 374 and a radial flange portion 376. The cylindrical portion 374 extends between the hub 348 and the outer disk drive 364 and has a plurality of apertures which captivate the balls 370 for axial displacement therewith. The radial flange portion of the cage member 372 is engaged by an annular flexible diaphragm 378 having one end engaging the internal surface of a cylindrical rim portion 380 of the actuator housing 358 and the other end attached to the cylindrical extension 350 of the hub 348. The actuator housing 358 may have an annular recess 382 in which the periphery of the diaphragm 378 is held by means of a circular ring 384.

The central portion of the flexible diaphragm 378 has an annular bead 386 which is held in a groove 388 provided in the cylindrical extension 350 by a resilient sleeve 390.

A pair of belleville springs 392 and 394 disposed between the edge of the outer disk drive 364 and the radial flange 376 of the cage member biases the cage member 372 and the balls 370 in an axial direction away from the shaft 352.

A fluid connector 396 is rotatably connected to the portion of the cylindrical extension 350 which protrudes beyond the actuator housing 358.

A pair of snap rings 408 secure the fluid connector 396 against axial displacement along the cylindrical extension 350. The fluid connector 396 has a fluid port 398 which is connected to an annular recess 400 provided on the external surface of the cylindrical extension 350. A linear bore 402 connects the annular recess 400 to a fluid passageway 404 which exits inside the actuator housing 358 on the side of the diaphragm opposite the belleville springs 392 and 394. Alternatively, the fluid from the fluid port 398 may be connected to the inside of the actuator housing 358 by a spiral groove provided on the external surface of the cylindrical extension 350, as shown in FIG. 17, or by an annular recess provided in the outer surface of a sleeve received inside the cylindrical extension 350, as shown in FIG. 18. A pair of fluid seals 410 on either side of the fluid port 398 prevent fluid leakage from either side of the fluid connector 396.

In operation, the belleville springs 392 and 394 produce a force biasing the cage member 372 to the left in FIG. 19 which displaces the balls 370 to their extreme position at the left end of the helical grooves 366 and 368. The inner and outer disk members will now assume a first rotational position relative to each other which will displace the belt engaging elements 26 to a predetermined position. This predetermined position may be the fully extended radial position in which the effective diameter of the pulley has its maximum value or may be a fully retracted position in which the effective diameter of the pulley assembly has it's minimum value.

A pressurized fluid introduced into the fluid chamber between the actuator housing 358 and the diaphragm 378 will produce a force axially displacing the cage member 372 and the balls 370 to the right. The axial displacement of the balls 370 will cause the outer disk members 34 and 38 to rotate relative to the inner disk members 32 and 36. This rotation of the outer disk members 34 and 38 relative to the inner disk members 32 and 36 will radially displace the belt engaging elements 26 from their predetermined position towards the opposite extreme position. The pressure of the fluid biasing the diaphragm 378 will determine the position of the cage member 372 and, therefore, the effective diameter of the pulley assembly.

As with the fluid actuators described with reference to FIGS. 17 and 18, the integral fluid actuator shown in FIG. 19 may be disposed on either side of the variable diameter pulley assembly 300 and the balls 370 and helical grooves 366 and 368 may be replaced by pins 250 and slots 246 and 248 as shown on FIG. 17.

Although the invention has been described with reference to various embodiments of the variable diameter pulley assembly, it is understood that those skilled in the art are capable of developing still further alternate embodiments without departing from the spirit of the invention as described herein and set forth in the appended claims.

What is claimed is:

1. A continuously variable transmission system having at least one variable diameter pulley assembly coupled to at least a second pulley by a belt, said at least one variable diameter pulley assembly comprising:

a plurality of belt engaging members arranged in a circle having an axis of rotation, said circle defining an effective diameter for said at least one variable diameter pulley assembly, each of said belt engaging members having a central shank and a pair of bearing sections longitudinally extending from the opposite ends of said central shank, said central shank being adapted to engage said belt;

a pair of spatially separated inner disk members disposed concentric with said axis of rotation, one of said inner disk members being positioned adjacent to one end of said central shank and the other of said inner disk members being positioned adjacent to the other end of said central shank, each of said pair of inner disk members having a first plurality of guideways extending in a first direction, each guideway of said first plurality of guideways receiving therethrough a respective one of said pair of bearing sections of said belt engaging members;

a pair of outer disk members disposed concentric with said axis of rotation, each of said outer disk members being in juxtaposition with a respective one of said inner disk members on the side opposite said belt engaging members, each of said outer disk members having a second plurality of guideways extending in a direction opposite said first direction, each guideway of said second plurality of guideways intersecting a respective one of said first plurality of guideways and receiving therein a portion of said bearing section which extends through said respective one of said first plurality of guideways at said intersection;

a hub connectable to a shaft, said hub having a first guide rotating in a first direction about said hub concentric with said axis of rotation;

a disk drive member, circumscribing said hub, said disk drive member having a second guide facing said first guide, said second guide disposed at an angle to said first direction, said first and said second guides crossing each other;

means for connecting one pair of disk members selected from the group consisting of said pair of inner disk members and said pair of outer disk members to said hub and for connecting the other pair of disk members of said group to said disk drive member;

actuator means simultaneously engaging said first and said second guides at the location where they cross each other for locking said disk drive member to said hub for rotation therewith; and means for axially displacing said actuator means relative to said hub to displace the axial location where said first and said second guides cross each other to rotate said disk drive member relative to said hub, the rotation of said disk drive member relative to said hub rotating said pair of inner disk members relative to said pair of outer disk members, said rotation of said pair of inner disk members relative to said pair of outer disk members radially displacing said plurality of belt engaging members to change said effective diameter of said at least one variable diameter pulley assembly.

2. The transmission system of claim 1 wherein said hub has a cylindrical portion, said first guide is at least one helical slot passing through the wall of said cylindrical portion, said second guide is at least one slot passing through a wall of said disk drive member, and said actuator means is a radially disposed guide pin passing through said at least one helical slot and said at least one slot at the location where they cross each other.

3. The transmission system of claim 2 wherein said at least one slot passing through a wall of said disk drive member is at least one helical slot.

4. The transmission system of claim 3 wherein said hub has a plurality of helical slots, said disk drive member has a like plurality of helical slots and wherein said actuator means is a plurality of radially disposed guide pins, each guide pin passing through a respective one of said plurality of helical slots in said hub and a respective one of said plurality of helical slots in said disk drive member.

5. The transmission system of claim 3 wherein said hub has three helical slots, said disk drive member has three helical slots, and said actuator means is three radially disposed guide pins, each guide pin being received in a respective one helical slot in said disk drive member and said hub at the location where they cross each other.

6. The transmission system of claim 4 wherein said means for axially displacing said actuator means is a pin cage supported by said hub, said pin cage being movable relative to said hub along said axis of rotation, said pin cage captivating a portion of each of said plurality of radially disposed guide pins for movement along said axis of rotation therewith.

7. The transmission system of claim 6 wherein said means for connecting connects said pair of inner disk members to said hub and said pair of outer disk members to said disk drive member.

8. The transmission system of claim 6 wherein said means for connecting connects said pair of outer disk members to said hub and said pair of inner disk members to said disk drive member.

9. The transmission system of claim 6 further comprising a connector member connectable to an actuator and a thrust bearing connecting said connector member to said pin cage for axial displacement therewith, said thrust bearing decoupling said connector member from the rotation of said pin cage.

10. The transmission system of claim 9 further comprising a first linear actuator connected to said connector member of said at least one variable diameter pulley assembly for axial displacement thereof.

11. The transmission system of claim 10 wherein said at least a second pulley includes a second variable diameter pulley assembly.

12. The transmission system of claim 11 wherein said second variable diameter pulley assembly is the same as said at least one variable diameter pulley assembly and wherein said transmission system further includes a second linear actuator connected to said connector member of said second variable diameter pulley assembly for axial displacement thereof.

13. The transmission system of claim 11 wherein said second variable diameter pulley assembly is a variable diameter tensioner pulley assembly having a pair of inner and outer disk members resiliently biased relative to each other and a plurality of belt engaging members arranged in a circular pattern having a diameter which is a function of the rotational relationship of said pair of inner disk members to said pair of outer disk members.

14. The transmission system of claim 6 wherein said at least one variable diameter pulley assembly has an integral fluid actuator connected to said hub for axially displacing said pin cage in response to the application of a fluid.

15. The transmission system of claim 14 wherein said integral fluid actuator comprises:
 a housing connected to said hub forming an annular fluid chamber;
 a piston connected to said pin cage, said piston disposed in said housing dividing said annular fluid chamber into a first and a second fluid chamber; and means for alternatively supplying fluid to said first and second fluid chambers to axially displace said piston.

16. The transmission system of claim 15 wherein said piston is a radial flange extending from one end of said pin cage.

17. The transmission system of claim 14 wherein said fluid actuator comprises:
- a cup-shaped housing connected to said hub;
- a flexible diaphragm disposed in said cup-shaped housing normal to said axis of rotation, said flexible diaphragm forming in conjunction with said cup-shaped housing an annular fluid chamber;
- a radial member connected to said pin cage normal to said axis of rotation, said radial member engaging the side of said flexible diaphragm opposite said annular fluid chamber;
- a resilient member engaging said radial member to produce a force axially biasing said radial member in a direction urging said pin cage to displace said plurality of radially disposed guide pins to one end of said plurality of helical slots; and
- means for supplying a fluid to said annular fluid chamber to produce a force on said radial member compressing said resilient member and urging said pin cage to displace said plurality of radially disposed guide pins towards the other end of said plurality of helical slots.

18. The transmission system of claim 1 wherein said first guide is at least a first helical groove provided in the external surface of said hub, said second guide is at least a second helical groove provided in the internal surface of said disk drive member crossing said first helical groove, and said actuator means is a ball disposed in said at least one first and said at least one second helical grooves at the location where they cross each other.

19. The transmission system of claim 18 wherein said at least a first helical groove is a plurality of first helical grooves, said at least a second helical groove is a plurality of second helical grooves, and said actuator means is a plurality of balls, one of said balls being disposed in said first and second helical grooves at the locations where they cross each other.

20. The transmission system of claim 19 wherein said means for axially displacing said actuator means is a ball cage disposed between said hub and said disk drive member, said ball cage being movable relative to said hub and said disk drive member along said axis of rotation, said ball cage captivating said plurality of balls for movement therewith.

21. The transmission system of claim 20 further comprising a connector member connectable to an actuator and a thrust bearing connecting said connector member to said ball cage for axial displacement therewith, said thrust bearing decoupling said connector member from the rotation of said ball cage.

22. The transmission system of claim 21 having at least a first actuator connected to said connector member of said at least one variable diameter pulley assembly to axially displace said ball cage of said at least one variable diameter pulley assembly.

23. The transmission system of claim 22 wherein said at least a second pulley includes a second variable diameter pulley assembly.

24. The transmission system of claim 23 wherein said second variable diameter pulley assembly is the same as said at least one variable diameter pulley assembly, and wherein said transmission system further has a second actuator connected to said connector member of said second variable diameter pulley assembly to axially displace said ball cage of said second variable diameter pulley assembly.

25. The transmission system of claim 23 wherein said second variable diameter pulley assembly is a variable diameter tensioner pulley assembly having a pair of inner disk members and a pair of outer disk members resiliently biased relative to each other and a plurality of belt engaging members connected to said pairs of inner and outer disk members and arranged in a circular pattern having a diameter which is a function of the rotational relationship of said inner disk members relative to said outer disk members.

26. The transmission system of claim 20 wherein said at least one variable diameter pulley assembly has an integral fluid actuator connected to said hub for axially displacing said ball cage in response to the application of a fluid.

27. The transmission system of claim 26 wherein said integral fluid actuator comprises:
- a housing enclosing an annular chamber, said housing being connected to said hub;
- a piston connected to said ball cage, said piston being disposed in said housing dividing said annular chamber into a first fluid chamber and a second fluid chamber; and
- means for independently applying fluid to said first and second fluid chambers to axially displace said piston and said ball cage.

28. The transmission system of claim 26 wherein said piston is an annular flange extending normal to said axis of rotation from one end of said ball cage.

29. The transmission system of claim 26 wherein said integral fluid actuator comprises:
- a cup-shaped housing having a central aperture connected to said hub;
- a flexible diaphragm disposed in said cup-shaped housing normal to said axis of rotation, said flexible diaphragm forming in conjunction with said cup-shaped housing an annular fluid chamber;
- a radial member connected to said ball cage engaging said flexible diaphragm on the side opposite said annular fluid chamber;
- a resilient member engaging said radial member producing a force urging said radial member and said ball cage to axially displace said plurality of balls towards one end of said plurality of first and second helical grooves; and
- means for supplying a pressurized fluid to said annular fluid chamber producing a force compressing said resilient member and urging said radial member and said ball cage to axially displace said balls towards the other end of said plurality of first and second helical grooves.

30. The transmission system of claim 1 wherein said at least one variable diameter pulley assembly has an integral fluid actuator connected to said hub for axially displacing said actuator means along said axis of rotation.

31. The transmission system of claim 30 wherein said integral fluid actuator comprises:
- a housing connected to said hub forming an annular chamber;
- a piston disposed in said housing dividing said annular chamber into a first and a second fluid chamber, said piston being connected to said means for axially displacing said actuator means; and means for alternatively supplying a fluid to said first and second fluid chambers to axially displace said piston.

32. The transmission system of claim 30 wherein said integral fluid actuator comprises:
- a cup-shaped housing member attached to said hub and concentric therewith;
- a flexible diaphragm disposed in said cup-shaped housing normal to said axis of rotation to form an annular fluid chamber;
- a radial member connected to said means for axially displacing said actuator means, said radial member engaging the side of said flexible diaphragm opposite said annular fluid chamber;
- a resilient member engaging said radial member producing a force urging said flexible diaphragm and said radial member to displace said actuator means towards one end of said first and second guides; and
- means for conducting a fluid to said annular fluid chamber to produce a force urging said radial member and said actuator means towards the other end of said first and second guides.

33. A variable diameter pulley assembly for a continuously variable transmission system, said variable diameter pulley assembly comprising:
- a pair of spatially separated out disk members having a common axis of rotation, each of said outer disk members having a first plurality of guideways extending therethrough in a first direction;
- a pair of inner disk members disposed between said outer disk members and concentric therewith, each one of said pair of inner disk members being associated with a respective one of said outer disk members and located adjacent thereto, each of said inner disk members further having a second plurality of guideways extending therethrough in a direction opposite said first direction, each guideway of said second plurality of guideways intersecting said guideways of said first plurality of guideways, said intersections forming at least one circular pattern concentric with said axis of rotation;
- a plurality of belt engaging elements disposed between said pair of spatially separated outer disk members, each of said plurality of belt engaging members having its opposite ends supported in one of said intersections between said first and second plurality of guideways forming said at least one circular pattern, said plurality of belt engaging elements forming a circle whose diameter is an effective diameter of said variable diameter pulley assembly;
- a hub adapted to be connected to a shaft, said hub having at least one first guide;
- a cylindrical disk drive member concentric with said hub, said cylindrical disk drive member having at least one second guide angularly disposed relative to said at least one first guide, said at least one second guide crossing said at least one first guide to form an intersection, the location of said intersection along said axis of rotation being variable as a function of the relative rotational orientation of said disk drive member relative to said hub;
- means for connecting one pair of disk members selected from the group consisting of said pair of inner disk members and said pair of outer disk members to said hub and for connecting the other pair of disk members of said group to said cylindrical disk drive member;
- at least one actuator member engaging said at least one first guide and said at least one second guide at said intersection locking said disk drive member to said hub for rotation therewith; and
- means for axially displacing said at least one actuator member to change the location of said intersection of said at least one first guide and said at least one second guide along said axis of rotation to rotate said disk drive member relative to said hub.

34. The pulley assembly of claim 33 wherein said hub has a cylindrical portion, said at least one first guide is at least a first helical slot radially extending through the wall of said cylindrical portion, said at least one second guide is at least a second helical slot radially extending through the wall of said cylindrical disk drive member, and said at least one actuator member is a pin radially extending through said first and second helical slots at said intersection.

35. The pulley assembly of claim 33 wherein said hub has a cylindrical portion, said at least one first guide is a first plurality of equally spaced helical slots extending through the wall of said cylindrical portion, said at least one second guide is a second plurality of equally spaced helical slots extending radially through the wall of said cylindrical disk drive member, each helical slot of said first plurality of helical slots intersecting a respective one helical slot of said second plurality of helical slots to form a plurality of through apertures at said intersections, and said at least one actuator member is a plurality of radially disposed pins, one pin of said plurality of radially disposed pins being disposed in each of said plurality of through apertures.

36. The pulley assembly of claim 35 wherein said means for axially displacing said at least one actuator member is a pin cage supported by said hub, said pin cage being axially displaceable relative to said hub along said axis of rotation and captivating a portion of each of said plurality of radially disposed pins to displace said plurality of radially disposed pins therewith.

37. The pulley assembly of claim 36 further comprising:
- a connector member connectable to a stationary actuator; and
- a thrust bearing connecting said connector member to said pin cage, said thrust bearing decoupling said connector member from the rotation of said pin cage and coupling the axial displacement of said connector member to said pin cage.

38. The pulley assembly of claim 36 further comprising an integral fluid actuator attached to said hub to axially displace said pin cage in response to a pressurized fluid.

39. The pulley assembly of claim 33 wherein said at least one first guide is a first plurality of equally spaced helical grooves provided in the external surface of said hub, said at least one second guide is a second plurality of equally spaced helical grooves provided on the internal surface of said cylindrical disk drive member, each helical groove of said first plurality of equally spaced helical grooves crossing a respective one helical groove of said second plurality of equally spaced helical grooves to form a plurality of groove intersections, and said at least one actuator member is a plurality of balls, one ball of said plurality of balls being disposed in each of said plurality of groove intersections.

40. The pulley assembly of claim 39 wherein said means for axially displacing said at least one actuator member is a ball cage disposed between said hub and said cylindrical disk drive member and axially displaceable therebetween, said ball cage captivating said plurality of balls for axial displacement therewith.

41. The pulley assembly of claim 40 further comprising:
a connector member connectable to a stationary actuator; and
a thrust bearing connecting said connector member to said ball cage to axially displace said ball cage, said thrust bearing decoupling said connector member from the rotation of said ball cage.

42. The pulley assembly of claim 41 further comprising an integral fluid actuator attached to said hub to axially displace said ball cage relative to said hub and said cylindrical disk drive member in response to the application of a pressurized fluid.

43. The pulley assembly of claim 33 further comprising an integral fluid actuator attached to said hub to axially displace said at least one actuator member to rotate said cylindrical disk drive member relative to said hub.

44. The pulley assembly of claim 43 wherein said integral fluid actuator comprises:
a fluid actuator housing attached to said hub, said fluid actuator housing enclosing an annular chamber circumscribing said hub;
an annular piston connected to said means for axially displacing said at least one actuator means, said annular piston being disposed in said housing and dividing said annular chamber into a first fluid chamber and a second fluid chamber; and
means for independently supplying a pressurized fluid to said first and second fluid chambers to axially displace said piston along said axis of rotation, said displacement of said piston axially displacing said at least one actuator member thereby rotating said cylindrical disk drive relative to said hub and said pair of inner disk members relative to said pair of outer disk members.

45. The pulley assembly of claim 43 wherein said integral fluid actuator comprises:
a cup-shaped housing connected to said hub, concentric with said axis of rotation;
a flexible diaphragm disposed in said cup-shaped housing normal to said axis of rotation to form an annular fluid chamber therein;
an annular actuator disk engaging said flexible diaphragm on the side opposite said annular fluid chamber; said annular actuator disk being connected to said means for axially displacing said at least one actuator member;
resilient means engaging said annular actuator disk to produce a force urging said annular actuator disk and said means for displacing in an axial direction to displace said at least one actuator member towards one end of said first and second guides; and
means for supplying a pressurized fluid to said annular fluid member to produce a force urging said annular actuator disk and said means for displacing in an axial direction to displace said at least one actuator member towards the opposite end of said at least one first and second guides.

46. A continuously variable transmission system having at least a first variable diameter pulley assembly and at least a second pulley connected by a drive belt, said at least a first variable diameter pulley assembly having a plurality of belt engaging elements arranged in a circle having an axis of rotation, each of said belt engaging elements having its opposite ends supported by a pair of concentric lateral support members, each of said pair of concentric lateral support members having an inner disk member and a juxtapositioned outer disk member, said inner disk members being connected together and said outer disk members being connected together, each inner disk member having a first set of guideways extending in a first direction and each outer disk member having a second set of guideways extending in the opposite direction, each guideway of said first set of guideways intersecting an associated guideway of said second set of guideways to form a plurality of through apertures in at least one circular pattern, the diameter of said at least one circular pattern being variable as a function of the rotational orientation of said inner disk members relative to said outer disk members, each of said belt engaging elements having their ends received in said plurality of through apertures forming said at least one circular pattern, the pulley assembly further having means for rotatably displacing said inner disk members relative to said outer disk members to radially change the location of said plurality of through apertures, varying the effective diameter of said circular pattern of said plurality of belt engaging elements, the improvement characterized by:
a hub attachable to a shaft, said hub having an axis of rotation and first guide means rotating about said hub in a first direction about said axis of rotation;
a disk drive member having second guide means adjacent to said first guide means and rotating about said axis of rotation in a direction opposite said first direction, said first guide means crossing said second guide means to form an intersection whose position along said axis of rotation is variable as a function of the rotational orientation of said disk drive member to said hub;
means for connecting one pair of disk members selected from a group comprising said inner disk members and said outer disk members to said hub and connecting the other pair of disk members of said group to said disk drive member;
an actuator member engaging said first and second guide means at said intersection, the location of said actuator member along said axis of rotation determining the location of said intersection and the rotational orientation of said disk drive member relative to said hub; and
means for displacing said actuator member along said axis of rotation to rotate said inner disk members relative to said outer disk members and to change the diameter of said circle formed by said plurality of belt engaging members.

47. The improvement of claim 46 wherein said hub and said disk drive member each have a cylindrical wall concentric with said axis of rotation, said first guide means is at least a first helical slot passing through said cylindrical wall of said hub in a radial direction, said second guide means is at least a second helical slot passing through said cylindrical wall of said disk drive member in a radial direction, said second helical slot crossing said first helical slot at said intersection to form a through aperture passing through said cylindrical wall of said hub and said cylindrical wall of said disk drive member and said actuator member is a radial pin received in said through aperture engaging said hub and said disk drive member at said intersection.

48. The improvement of claim 46 wherein said hub and said disk drive member each have a cylindrical wall, said first guide means is a plurality of equally spaced first helical slots passing through said cylindrical wall of said hub in a radial direction, said second guide means is a plurality of second helical slots passing through said cylindrical wall of said disk drive member in a radial direction, each second helical slot crossing a respective one of said first helical slots to form a plurality of through apertures through said cylindrical wall of said hub and said cylindrical wall of said disk drive member, and wherein said actuator member is a plurality of radial pins, one of said plurality of radial pins received in each of said through apertures engaging said hub and said disk drive member at said intersection.

49. The improvement of claim 48 wherein said means for displacing said actuator member is a pin cage slidably supported by said hub, said pin cage captivating a portion of each radial pin of said plurality of radial pins for displacement therewith along said axis of rotation.

50. The improvement of claim 49 wherein said at least a first variable diameter pulley assembly further comprises:
a connector member connectable to an actuator; and
bearing means for connecting said connector member to said pin cage to provide for the displacement of said pin cage along said axis of rotation by said actuator, said bearing means decoupling said connector member from the rotation of said pin cage.

51. The improvement of claim 49 wherein said at least a first variable diameter pulley assembly further comprises:
an actuator housing connected to said hub, said actuator housing enclosing an annular chamber;
an annular piston connected to said pin cage, said annular piston disposed in said actuator housing dividing said annular chamber into a first fluid chamber on one side of said piston and a second fluid chamber on the other side of said piston;
means for supplying pressurized fluid to said first and second fluid chambers, in an alternative manner, to generate a force urging said piston to move in an axial direction along said axis of rotation and changer the location of said plurality of radial pins to rotate said disk drive member relative to said hub.

52. The improvement of claim 49 wherein said at least a first variable diameter pulley assembly further comprises:
a cylindrical actuator housing attached to said hub concentric with said axis of rotation, said cylindrical actuator housing having at least one enclosed end;
an annular flexible diaphragm disposed in said actuator housing normal to said axis of rotation and forming a fluid chamber therein, said fluid chamber bounded between said enclosed end and said flexible diaphragm;
a radial flange normal to said axis of rotation attached to said pin cage, said radial flange engaging said flexible diaphragm on the side opposite said fluid chamber;
a resilient member biasing said radial flange towards said enclosed end of said actuator housing to rotate said disk drive member relative to said hub in a first direction; and
means for supplying pressurized fluid to said fluid chamber producing a force urging said radial flange and said pin cage away from said enclosed end along said axis of rotation to rotate said disk drive member relative to said hub in a direction opposite said first direction.

53. The improvement of claim 46 wherein said first guide means is a plurality of equally spaced first helical grooves provided on an external surface of said hub, said second guide means is a like plurality of second helical grooves provided on an internal surface of said disk drive member, each of said second helical grooves crossing a respective one of said first helical grooves to form a plurality of said intersections, and wherein said actuator member is a plurality of balls, one ball of said plurality of balls being disposed in each of said intersections and engaging said first and second helical grooves.

54. The improvement of claim 53 wherein said means for displacing said actuator member is a ball cage disposed between said hub and said disk drive member and axially displaceable therebetween, said ball cage captivating each ball of said plurality of balls for axial displacement therewith along said axis of rotation.

55. The improvement of claim 54 further comprising:
a connector member concentric with said ball cage, said connector member connectable to an actuator, and
bearing means for connecting said connector member to said ball cage for displacing said ball cage along said axis of rotation in response to said actuator, said bearing means decoupling said connector member from the rotation of said ball cage.

56. The improvement of claim 54 wherein said at least a first variable diameter pulley assembly further comprises:
an actuator housing connected to said hub enclosing an annular chamber concentric with said axis of rotation;
an annular piston connected to said ball cage, said annular piston being disposed in said actuator housing normal to said axis of rotation to divide said annular chamber into a first fluid chamber on one side of said piston and a second fluid chamber on the other side of said piston; and
means for supplying pressurized fluid to said first and second fluid chambers to generate a force biasing said piston to move in an axial direction along said axis of rotation and move the location of said plurality of balls to rotate said disk drive member relative to said hub.

57. The improvement of claim 54 wherein said at least a first variable diameter pulley assembly further comprises:
a cylindrical actuator housing having an enclosed end, said cylindrical actuator housing being attached to said hub concentric with said axis of rotation;
an annular flexible diaphragm disposed in said cylindrical actuator housing normal to said axis of rotation to form a fluid chamber, said fluid chamber bounded at one end by said enclosed end of said cylindrical actuator housing and by said flexible diaphragm at the opposite end;
an annular flange connected to said ball cage, said annular flange engaging said flexible diaphragm on the side opposite said fluid chamber;
resilient means for producing a force urging said annular flange and said ball cage towards said enclosed end of said cylindrical actuator housing to rotate said disk drive member relative to said hub in a first direction; and means for supplying a pressurized fluid to said fluid chamber to produce a force urging said annular flange and said ball cage away from said enclosed end of said cylindrical actuator housing to rotate said disk drive member relative to said hub in a direction opposite from said first direction.

58. A variable diameter pulley assembly for a continuously variable transmission system comprising:

a plurality of belt engaging elements arranged in a circle having an axis of rotation, said circle defining the diameter of said variable diameter pulley assembly;

a first end support connected to one end of said plurality of belt engaging elements, said first end support having a first inner disk member and a first outer disk member juxtapositioned said first inner disk member on the side opposite said plurality of belt engaging elements, said first inner and said first outer disk members each having a plurality of guideways spiraling outwardly, said plurality of guideways of said first inner disk member spiraling in a first direction and said plurality of guideways in said first outer disk members spiraling in a second direction opposite said first direction, said plurality of guideways intersecting each other to form a plurality of through apertures in a circular pattern having diameter variables as a function of the rotational orientation of said first inner disk member relative to said first outer disk member, each of said through apertures receiving therein said one end of each of said plurality of belt engaging members;

a second end support connected to the other end of said plurality of belt engaging elements, said second end support having a second inner disk member and a second outer disk member juxtapositioned said second inner disk member on the side opposite said plurality of belt engaging elements, said second inner and said second outer disk members each having a plurality of guideways spiraling outwardly, said plurality of guideways of said second inner disk member spiraling in said first direction and said plurality of guideways of said second outer disk member spiraling in said second direction, said plurality of guideways in said second inner and outer disk members intersecting each other to form a plurality of through apertures in a second circular pattern identical to said first circular pattern, said second circular pattern having a diameter variable as a function of the rotational orientation of said second inner disk member relative to said second outer disk member, each of said through apertures receiving therein said other end of each of said plurality of belt engaging elements;

a hub connectable to a shaft, said hub having a first guide rotating about said hub in a first direction concentric with said axis of rotation;

means for connecting one pair of disk members to said hub for rotation therewith, said one pair of disk members selected from a group consisting of a first pair comprising said first and second inner disk members and a second pair comprising said first and second outer disk members;

a disk drive member connected to the other of said pair of disk members selected from the group consisting of said first pair and said second pair, said disk drive member having a second guide disposed at an angle relative to said first guide, said second guide crossing said first guide to form an intersection, the location of said intersection along said axis of rotation being a function of the rotational orientation of said disk drive member relative to said hub;

a guide engagement member disposed at said intersection and engaging said first and second guides; and means for moving said guide engagement member along said axis of rotation to rotate said disk drive member relative to said hub causing a change in the diameter of said circle formed by said plurality of belt engaging elements.

59. The variable diameter pulley assembly of claim 58 wherein said hub and said disk drive member each have a cylindrical wall, said first guide is a plurality of first helical slots provided through said cylindrical wall of said hub, said second guide is a plurality of second helical slots provided through said cylindrical wall of said disk drive member, each of said second helical slots crossing a respective one of said first helical slots to form a plurality of through apertures, each through aperture passing through said cylindrical wall of said hub and said cylindrical wall of said disk drive member, and wherein said guide engagement member is a plurality of actuator pins, one of said plurality of actuator pins being received in each of said through apertures and simultaneously engaging said first and second helical slots, and said means for moving said guide engagement member is a pin cage rotatable with said hub, said pin cage captivating a portion of each pin of said plurality of actuator pins to displace said plurality of actuator pins along said axis of rotation with the axial displacement of said pin cage, the displacement of said plurality of actuator pins along said axis of rotation rotating said disk drive member relative to said hub.

60. The variable diameter pulley assembly of claim 59 wherein said first and second helical slots are equally spaced about said axis of rotation and said through apertures are disposed along a plane normal to said axis of rotation.

61. The variable diameter pulley assembly of claim 59 further comprising a fluid actuator connected between said hub and said pin cage to axially displace said pin cage relative to said hub in response to the application of a pressurized fluid to said fluid actuator.

62. The variable diameter pulley assembly of claim 58 wherein said first guide is a plurality of first helical grooves provided in the external surface of said hub, said second guide is a plurality of second helical grooves provided on the internal surface of said disk drive member, each of said second helical grooves crossing a respective one of said first helical grooves to form a plurality of intersections, said guide engagement member is a plurality of balls, one ball of said plurality of balls being disposed in each of said intersections, and said means for moving said guide engagement member is a cage slidably disposed between said hub and said disk drive member, said cage captivating said plurality of balls for axial displacement therewith along said axis of rotation to rotate said disk drive member relative to said hub.

63. The variable diameter pulley assembly of claim 62 wherein said plurality of first and second helical grooves are equally spaced about said axis of rotation and said intersection lies along a plane normal to said axis of rotation.

64. The variable diameter pulley assembly of claim 62 further comprising a fluid actuator attached between said hub and said cage to axially displace said cage relative to said hub in response to the application of a fluid pressure to said fluid actuator.

* * * * *

UNITED STATES PATENT AND TRADEMARK OFFICE
CERTIFICATE OF CORRECTION

PATENT NO. : 4,938,732

DATED : July 3, 1990

INVENTOR(S) : Krude

It is certified that error appears in the above-identified patent and that said Letters Patent is hereby corrected as shown below:

Column 10, line 44, delete "annular" and insert ---- angular ----.

Column 13, line 40, delete "engage" and insert ---- engaging ----.

Column 13, line 42, after "of" insert ---- the ----.

Column 16, line 25, delete "it's" and insert ---- its ----.

Column 25, line 46, delete "changer" and insert ---- change ----, same line, after "of" (second occurrence) insert ---- said ----.

UNITED STATES PATENT AND TRADEMARK OFFICE
CERTIFICATE OF CORRECTION

PATENT NO. : 4,938,732

DATED : July 3, 1990

INVENTOR(S) : Krude

It is certified that error appears in the above-identified patent and that said Letters Patent is hereby corrected as shown below:

Column 26, line 26, after "actuator" delete the comma "," and insert a semi-colon ---- ; ----.

In the Abstract

Line 13, after "disk" insert ---- drive ----.

Signed and Sealed this

Eleventh Day of February, 1992

Attest:

HARRY F. MANBECK, JR.

Attesting Officer

Commissioner of Patents and Trademarks